US012096316B2

(12) United States Patent
Endo et al.

(10) Patent No.: US 12,096,316 B2
(45) Date of Patent: *Sep. 17, 2024

(54) INFORMATION PROCESSING DEVICE, INFORMATION PROCESSING METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventors: Masato Endo, Nagakute (JP); Yuichiro Haruna, Oyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,997

(22) Filed: Aug. 29, 2022

(65) Prior Publication Data

US 2022/0417712 A1  Dec. 29, 2022

Related U.S. Application Data

(63) Continuation of application No. 16/227,233, filed on Dec. 20, 2018, now Pat. No. 11,470,456.

(30) Foreign Application Priority Data

Dec. 22, 2017  (JP) ................. 2017-246920

(51) Int. Cl.
*H04W 4/35*    (2018.01)
*G06Q 10/0833* (2023.01)
(Continued)

(52) U.S. Cl.
CPC ......... *H04W 4/35* (2018.02); *G06Q 10/0833* (2013.01); *H04W 4/44* (2018.02); *H04W 4/029* (2018.02)

(58) Field of Classification Search
CPC ......... H04W 4/35; H04W 4/44; H04W 4/029; G06Q 10/0833
See application file for complete search history.

(56) References Cited

U.S. PATENT DOCUMENTS 7,245,997 B2 * 7/2007 Kitao ................. B60R 25/33
                                                340/426.2
8,342,400 B1   1/2013 Reese
(Continued)

FOREIGN PATENT DOCUMENTS

CN  101203873 A   6/2008
JP  2002226050 A  8/2002
(Continued)

OTHER PUBLICATIONS

Bertschy, Kimberly, Vehicle Computer and Network Security: Vulnerabilities and Recommendations, Utica College, Aug. 2015.*

*Primary Examiner* — Nathan Erb
(74) *Attorney, Agent, or Firm* — Hunton Andrews Kurth LLP

(57) ABSTRACT

An information processing system relates to a delivery service in which a vehicle cabin including a trunk of a vehicle used by a user is designated as a delivery destination of a package. The information processing system includes a center server configured to remind the user to receive the package from the vehicle cabin of the vehicle designated by the user as the delivery destination of the package, in a case where the package is not received from the vehicle cabin of the vehicle after a predetermined time has elapsed since the package was delivered to the vehicle cabin of the vehicle.

20 Claims, 10 Drawing Sheets

(51) Int. Cl.
*H04W 4/44* (2018.01)
*H04W 4/029* (2018.01)

(56) References Cited

U.S. PATENT DOCUMENTS

| | | | |
|---|---|---|---|
| 10,267,668 B1 | 4/2019 | Slavin et al. | |
| 11,470,456 B2 * | 10/2022 | Endo | H04W 4/44 |
| 2002/0080030 A1 | 6/2002 | Inomata | |
| 2013/0144428 A1 | 6/2013 | Irwin et al. | |
| 2013/0268391 A1 | 10/2013 | Esch et al. | |
| 2013/0321178 A1 | 12/2013 | Jameel et al. | |
| 2015/0242811 A1 * | 8/2015 | Gillen | G06Q 50/01 |
| | | | 705/338 |
| 2016/0026967 A1 | 1/2016 | Shah et al. | |
| 2016/0027261 A1 | 1/2016 | Motoyama | |
| 2016/0099927 A1 | 4/2016 | Oz et al. | |
| 2016/0189098 A1 | 6/2016 | Beaurepaire et al. | |
| 2016/0350830 A1 | 12/2016 | Youssef | |
| 2017/0286905 A1 | 10/2017 | Richardson et al. | |
| 2017/0337437 A1 * | 11/2017 | Kanagaraj | G01G 19/08 |
| 2018/0108242 A1 * | 4/2018 | Wilkinson | G08B 31/00 |
| 2018/0197027 A1 * | 7/2018 | Ali | F02D 41/042 |
| 2018/0233045 A1 | 8/2018 | Kumar | |
| 2018/0246526 A1 | 8/2018 | Wilkinson et al. | |
| 2023/0237899 A1 * | 7/2023 | Lamb | G08B 29/185 |
| | | | 340/506 |

FOREIGN PATENT DOCUMENTS

| | | |
|---|---|---|
| JP | 2006206225 A | 8/2006 |
| JP | 2007268024 A | 10/2007 |
| JP | 2012063845 A | 3/2012 |
| JP | 2015045141 A | 3/2015 |
| JP | 2016028981 A | 3/2016 |
| WO | 2007002211 A2 | 1/2007 |

* cited by examiner

INFORMATION PROCESSING DEVICE, INFORMATION PROCESSING METHOD, AND NON-TRANSITORY COMPUTER-READABLE STORAGE MEDIUM

INCORPORATION BY REFERENCE

This is a continuation application of U.S. patent application Ser. No. 16/227,233, filed Dec. 20, 2018, which claims the disclosure of Japanese Patent Application No. 2017-246920 filed on Dec. 22, 2017 including the specification, drawings and abstract are incorporated herein by reference in their entirety.

BACKGROUND

1. Technical Field

The present disclosure relates to an information processing device, an information processing method, and a non-transitory computer-readable storage medium storing an information processing program.

2. Description of Related Art

For example, a mechanism for using a vehicle cabin such as a trunk as a delivery destination of a package is disclosed (see Japanese Unexamined Patent Application Publication No. 2006-206225 (JP 2006-206225 A) or the like).

Specifically, authentication information (key information) for unlocking the vehicle is distributed to a delivery company (for example, a mobile terminal carried by a deliverer). Specifically, when a predetermined transmission signal including the key information is transmitted from the mobile terminal carried by the deliverer to the vehicle and accordingly, authentication based on the key information included in the transmission signal is successful on the vehicle side, a door accessing the trunk of the vehicle (for example, a trunk lid or a back door) is unlocked. Consequently, the deliverer can put the package in the trunk. Accordingly, a delivery company can provide a customer with a delivery service in which a vehicle cabin such as the trunk of the vehicle can be designated as a delivery destination (hereinafter simply referred to as a "vehicle cabin delivery service").

SUMMARY

However, the user of the vehicle cabin delivery service (i.e. client of the package) cannot directly receive the package from the deliverer in a case where the vehicle cabin of the vehicle is designated as a delivery destination of the package, unlike a case where the package is delivered to the home or the like. Consequently, the user is likely to forget that the package has been delivered to the vehicle cabin and to leave the delivered package in the vehicle cabin even after a delivery completion notification is transmitted to, for example, a mail address of the user.

According to the aspects of the present disclosure, it is possible to provide an information processing device, an information processing method, and a non-transitory computer-readable storage medium storing an information processing program capable of suppressing that a user leaves a delivered package in a vehicle cabin of a vehicle in a delivery service in which the vehicle cabin of the vehicle used by the user can be designated as a delivery destination of the package.

A first aspect of the present disclosure relates to an information processing device relating to a delivery service in which a vehicle cabin including a trunk of a vehicle used by a user is designated as a delivery destination of a package. The information processing device includes a processing device configured to remind the user to receive the package from the vehicle cabin of the vehicle designated by the user as the delivery destination of the package, when the package is not received from the vehicle cabin after a predetermined time has elapsed since the package was delivered to the vehicle cabin.

According to the first aspect of the present disclosure, the information processing device is capable of prompting the user (client) to receive the package by reminding the user to receive the package when the package is not received from the vehicle cabin even after a certain time has elapsed since the delivery was completed. Consequently, the information processing device allows the user to receive the package delivered to the vehicle cabin relatively earlier after the completion of delivery by appropriately setting a reminding timing, i.e. the predetermined time. Therefore, the information processing device is capable of suppressing that the delivered package is left in the vehicle cabin.

In the information processing device according to the first aspect of the present disclosure, the processing device may be configured to acquire information on whether or not the package is received from the vehicle cabin of the vehicle. The processing device may be configured to determine whether or not the package is received from the vehicle cabin of the vehicle based on the information acquired by the processing device. The processing device may remind the user to receive the package from the vehicle cabin when the processing device determines that the package is not received from the vehicle cabin after the predetermined time has elapsed since the package was delivered to the vehicle cabin.

According to the first aspect of the present disclosure, the information processing device is capable of, by acquiring the information on whether or not the delivered package is received, determining whether or not the package is received from the vehicle cabin based on such information.

In the information processing device according to the first aspect of the present disclosure, the processing device may acquire information on locking of a door by the user, the door via which the user accesses the vehicle cabin designated by the user as the delivery destination of the package. The processing device may determine that the package is not received from the vehicle cabin when the processing device does not acquire the information indicating that the door has been locked by the user after the package was delivered to the vehicle cabin.

According to the first aspect of the present disclosure, the information processing device is capable of acquiring the information on locking of the door accessing the vehicle cabin by the user. For example, the information may contain information indicating that the door of the vehicle is locked by transmitting a signal containing the user specific key information to the vehicle for unlocking the door of the vehicle, which can be acquired from the vehicle. Accordingly, the information processing device can figure out whether or not the user has locked the door accessing the vehicle cabin of the vehicle after the package was delivered to the vehicle cabin designated as the delivery destination of the package based on the information. The information processing device can determine (estimate) that, when the user has locked the door accessing the vehicle cabin of the vehicle after the package was delivered, the user has accessed the vehicle cabin and received the package before locking the door. Besides, the information processing device can determine (estimate) that, when the user has not locked the door after the package was delivered, the user has not accessed the vehicle cabin. Therefore, specifically, the information processing device is capable of determining whether or not the delivered package is received from the vehicle cabin after the package was delivered based on the information on locking of the door accessing the vehicle cabin by the user.

In the information processing device according to the first aspect of the present disclosure, the processing device may acquire from the user, a receipt notification indicating that the user has received the package delivered to the vehicle cabin. The processing device may determine that the package is not received from the vehicle cabin when the processing device does not acquire the receipt notification after the package was delivered to the vehicle cabin.

According to the first aspect of the present disclosure, the information processing device is capable of acquiring the receipt notification from a user terminal or user's mail address by a method including, for example, notification function or e-mail executed by an application program (hereinafter, simply referred to as an "application") installed in the user's mobile terminal, such as a smartphone. Therefore, specifically, the information processing device is capable of determining whether or not the delivered package is received from the vehicle cabin of the vehicle after the package was delivered based on whether or not the receipt notification is acquired.

In the information processing device according to the first aspect of the present disclosure, the processing device may acquire position information of a mobile terminal carried by the user. The processing device may determine that the package is not received from the vehicle cabin of the vehicle when the position information of the mobile terminal, acquired by the processing device, does not indicate that the user has moved to within a predetermined range from the vehicle after the package was delivered to the vehicle cabin.

According to the first aspect of the present disclosure, the information processing device is capable of figuring out user's movement situation, specifically, whether or not the user has moved to near the vehicle (within the predetermined range) corresponding to the delivery destination of the package, by acquiring the position information of the mobile terminal carried by the user. Consequently, the information processing device can determine (estimate) that the user has received the package delivered to the vehicle cabin when the user has moved to vicinity of the vehicle corresponding to the delivery destination of the package after the delivery was completed. Besides, the information processing device can determine (estimate) that the user has not received the package delivered to the vehicle cabin when the user has not moved to vicinity of the vehicle corresponding to the delivery destination of the package after the delivery was completed. Therefore, specifically, the information processing device is capable of determining whether or not the delivered package is received from the vehicle cabin after the package was delivered based on the position information of the mobile terminal carried by the user.

In the information processing device according to the first aspect of the present disclosure, the processing device may remind the user to receive the package from the vehicle cabin by transmitting a reminder to a user terminal of the user, via a function provided by a predetermined application program installed in the user terminal of the user, when the package is not received from the vehicle cabin after the predetermined time has elapsed since the package was delivered to the vehicle cabin.

According to the first aspect of the present disclosure, the information processing device is capable of displaying the reminder relating to receipt of the package on, for example, a display device of the user terminal by an application installed in the user terminal (e.g. a mobile terminal such as a smartphone). Therefore, the information processing device is capable of reminding the user to receive the package in the vehicle cabin of the vehicle.

In the information processing device according to the first aspect of the present disclosure, the processing device may transmit to a mail address of the user, or a predetermined social networking service account of the user a reminder relating to receipt of the package from the vehicle cabin, when the package is not received from the vehicle cabin of the vehicle after the predetermined time has elapsed since the package was delivered to the vehicle cabin.

According to the first aspect of the present disclosure, the information processing device is capable of reminding the user, specifically, to receive the package from the vehicle cabin by transmitting the reminder to user's mail address or user's social networking service (SNS) account.

In the information processing device according to the first aspect of the present disclosure, the processing device may alter the predetermined time in response to a type of the package.

According to the first aspect of the present disclosure, the information processing device is capable of changing the timing of reminding the user in accordance with the type of the package.

In the information processing device according to the first aspect of the present disclosure, the processing device may set the predetermined time shorter in a case where the package contains a food as compared with a case where the package does not contain a food.

According to the first aspect of the present disclosure, the information processing device is capable of transmitting the reminder earlier when the package contains a food as compared with when the package does not contain a food. Therefore, since an expiration date is usually set for a food and earlier receipt is needed, the information processing device is capable of allowing the user to receive the package earlier when the package contains a food as compared with when the package does not contain a food.

In the information processing device according to the first aspect of the present disclosure, the processing device may set the predetermined time in a case where the package contains a gift presented to another by the user or presented to the user, such that the predetermined time passes before a date corresponding to the gift, or before an end date of a period corresponding to the gift.

According to the first aspect of the present disclosure, the information processing device is capable of reminding the user to receive the package from the vehicle cabin of the vehicle at the timing corresponding to a gift (for example, at the timing before the anniversary such as the birthday, or at the timing before the end date of the period corresponding to a limited-time gift such as a year-end present) when the package contains a gift. Therefore, the information processing device is capable of reminding the user to remember to receive the package before the anniversary is passed so as to suppress that the user fails to give a present to himself/herself or other people at the right timing.

In the information processing device according to the first aspect of the present disclosure, the processing device may set the predetermined time such that the predetermined time passes before a date and time when a next package is delivered to the vehicle cabin designated as a delivery destination of such a package.

According to the first aspect of the present disclosure, the information processing device is capable of reminding the user to receive the package delivered to the vehicle cabin before a date (for example, the delivery date and time designated by the user or the scheduled delivery date and time chosen by a delivery company) when the next package is delivered to the vehicle cabin. Consequently, the information processing device can allow the user to receive the delivered package before the next package is delivered. Therefore, the information processing device is capable of suppressing that the deliverer cannot put the package into the vehicle cabin due to the previous package that the user fails to pick up and from delivering such a package again, thereby improving the work efficiency of the vehicle cabin delivery service.

In the information processing device according to the first aspect of the present disclosure, the processing device may be configured to acquire information on a use schedule of the vehicle. The processing device may set the predetermined time such that the predetermined time passes before a closest date and time when another user of the vehicle, other than the user, will use the vehicle, or a closest date and time relating to another service using the vehicle other than the delivery service, in accordance with the information on the use schedule.

According to the first aspect of the present disclosure, the information processing device is capable of reminding the user to receive the package from the vehicle cabin before the closest date and time when another user will use the vehicle corresponding to the delivery destination after the package was delivered. Furthermore, the information processing device is capable of reminding the user to receive the package from the vehicle cabin before the closest date and time when a user of another service (for example, car sharing service to lend the vehicle) will use the vehicle corresponding to the delivery destination after the package was delivered. Therefore, the information processing device is capable of allowing the user to receive the package from the vehicle cabin corresponding the delivery destination before the vehicle is used by another user of the vehicle or a user of another service using the vehicle.

A second aspect of the present disclosure relates to an information processing method executed by an information processing device relating to a delivery service in which a vehicle cabin including a trunk of a vehicle used by a user is designated as a delivery destination of a package. The information processing method includes reminding the user to receive the package from the vehicle cabin of the vehicle designated by the user as the delivery destination of the package, when the package is not received from the vehicle cabin after a predetermined time has elapsed since the package was delivered to the vehicle cabin.

A third aspect of the present disclosure relates to a non-transitory computer-readable storage medium storing an information processing program causing an information processing device to execute the information processing method according to the second aspect of the present disclosure. The information processing device is related to a delivery service in which a vehicle cabin including a trunk of a vehicle used by a user is designated as a delivery destination of a package.

According to the aspects of the present disclosure, it is possible to provide the information processing device, the information processing method, and the non-transitory computer-readable storage medium storing the information processing program, which are capable of suppressing that the leaves the delivered package in the vehicle cabin in the delivery service in which the vehicle cabin used by the user can be designated as the delivery destination of the package.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments will be described with reference to the drawings.

Overall Configuration of Authentication Key Management System

Figure 1:
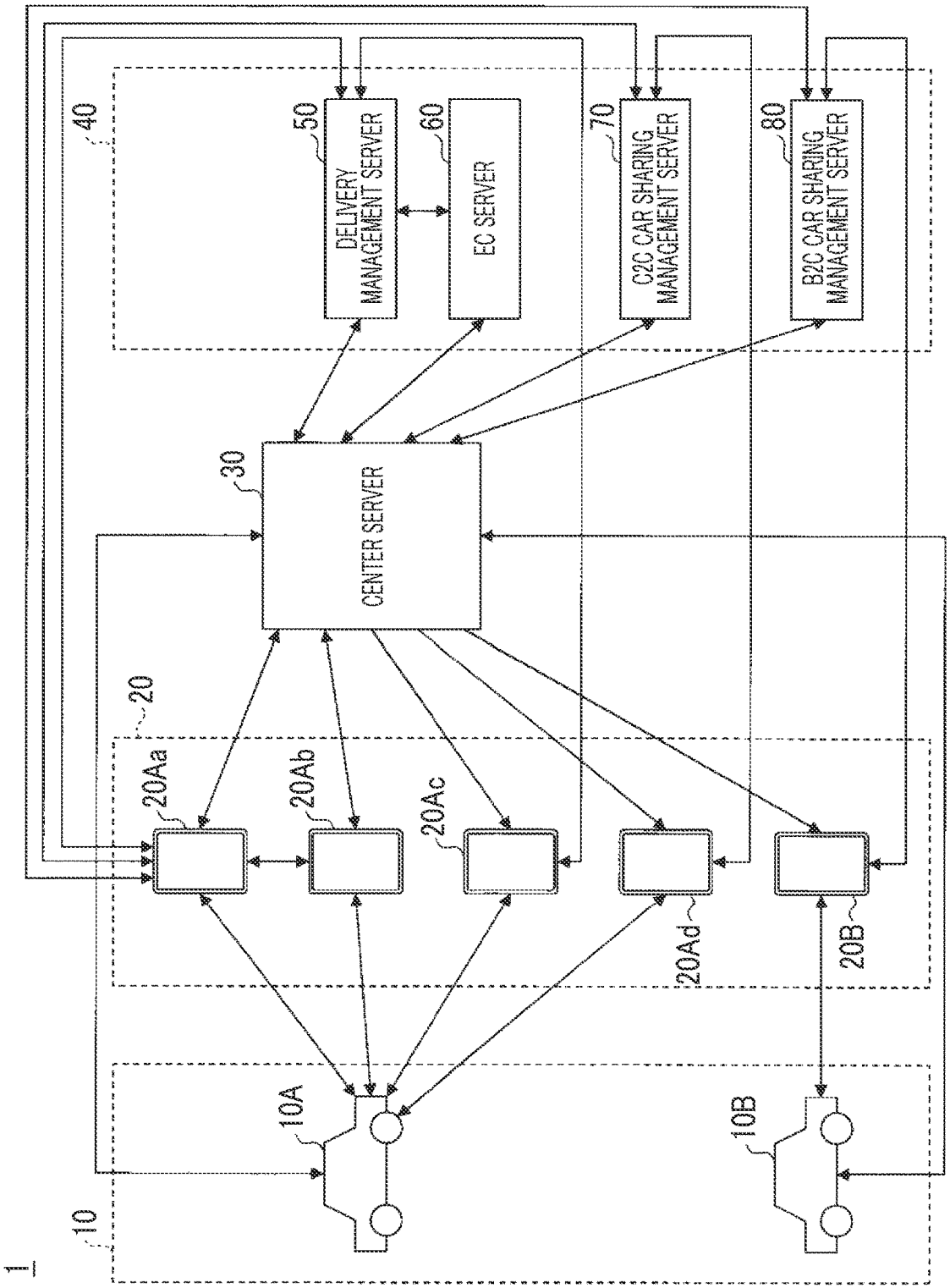
FIG. 1 is a diagram illustrating an example of an overall configuration of an authentication key management system.

FIG. 1 is a block diagram illustrating an example of an overall configuration of an authentication key management system 1 according to an embodiment.

An authentication key management system 1 includes a vehicle 10, a mobile terminal 20, a center server 30, and a service management server 40.

The vehicle 10 can perform wireless communication (hereinafter simply referred to as a "near field communication") with the mobile terminal 20 at a relatively short range (a distance that allows communication between the inside of a vehicle cabin and the outside of the vehicle cabin) according to a predetermined communication standard. The vehicle 10 is a target on which locking and unlocking of doors and activation (ignition on) of the vehicle 10 are performed based on transmission signals (an authentication request, a locking request, and an unlocking request to be described below) from the mobile terminal 20. The door of the vehicle 10 may include not only a door for getting on and off, but also a door for a cargo (for example, a trunk lid or a back door) for accessing a trunk (a luggage compartment). The ignition on (IG-ON) of the vehicle 10 may include ON of a power supply to an electric motor in the vehicle 10 using the electric motor as a main power source, in addition to startup of an engine in the vehicle 10 using the engine as a main power source. Hereinafter, in the embodiment, description will be given on the premise that the vehicle 10 includes an engine 117 to be described below as a main power source, the activation (IG-ON) of the vehicle 10 corresponds to startup of the engine 117, and stopping (IG-OFF) of the vehicle 10 corresponds to stopping of the engine 117.

The vehicle 10 is communicably connected to the center server 30 over a predetermined communication network (for example, a mobile phone network or an Internet network in which a plurality of base stations is terminations). The vehicle 10 transmits vehicle information such as position information to the center server 30, as described below.

The vehicle 10 includes a vehicle 10A owned by an individual and a vehicle 10B owned by a company providing a business to consumer (hereinafter simply referred to as a "B2C") car sharing service.

The mobile terminal 20 is communicably connected to the center server 30 over a predetermined communication network (for example, a mobile phone network or an Internet network in which a plurality of base stations is terminations). The mobile terminal 20 can unlock or lock the vehicle 10 by acquiring authentication key information (an example of key information. The authentication key information is hereinafter referred to as an "authentication key") distributed from the center server 30 and transmitting the acquired authentication key to the vehicle 10 through relatively short-range wireless communication according to a predetermined manipulation of the user. The mobile terminal 20 may be, for example, a general-purpose mobile phone, a smartphone, or a tablet terminal. As will be described below, a predetermined application program (hereinafter simply referred to as a "key application") installed in the built-in processing device 23 is activated, and thereby, the above-described function may be realized. The mobile terminal 20 may be a dedicated mobile terminal specialized for unlocking of the doors of the vehicle 10 and activation of the vehicle 10 by acquiring the authentication key from the center server 30 and using the acquired authentication key. The mobile terminal 20 includes mobile terminals 20Aa to 20Ad corresponding to the vehicle 10A and a mobile terminal 20B corresponding to the vehicle 10B.

The mobile terminal 20Aa is a mobile terminal carried by an owner (hereinafter simply referred to as an "owner user") among regular users of the vehicle 10A (hereinafter simply referred to as "regular users"). The mobile terminal 20Aa may bidirectionally communicate with the mobile terminal 20Ab through wireless communication at a relatively short range.

The mobile terminal 20Ab is a mobile terminal carried by a regular user other than the owner user of the vehicle 10A (for example, including a family member of the owner user and a close friend of the owner user. The regular user is hereinafter referred to as a "sub-user").

The sub-user may include a user who does not drive the vehicle 10A or a user who cannot drive (for example, an owner user's child under 18 years of age). This is because, for example, when solely a vehicle cabin delivery service to be described below is used, the regular user does not need to drive the vehicle 10A.

The mobile terminal 20Ac is carried by a deliverer of a company that provides a vehicle cabin delivery service to be described below (hereinafter simply referred to as a "delivery company"). The mobile terminal 20Ac is communicably connected to the center server 30 and a delivery management server 50 to be described below over a predetermined communication network (for example, a mobile phone network or an Internet network in which a plurality of base stations is terminations).

The mobile terminal 20Ad is a mobile terminal carried by a borrower of the vehicle 10A in a consumer to consumer (hereinafter simply referred to as a "C2C") car sharing service to be described below. The mobile terminal 20Ad is communicably connected to the center server 30 and a C2C car sharing management server 70 to be described below over the predetermined communication network (for example, a mobile phone network or an Internet network in which a plurality of base stations is terminations).

The mobile terminal 20B is a mobile terminal carried by the borrower of the vehicle 10B in a B2C car sharing service to be described below. The mobile terminal 20B is communicably connected to the center server 30 and a B2C car sharing management server 80 to be described below over the predetermined communication network (for example, a mobile phone network or an Internet network in which a plurality of base stations is terminations).

The center server 30 is communicably connected to the vehicle 10, the mobile terminal 20, and the service management server 40.

The center server 30 manages issuance of an authentication key of the vehicle 10. For example, the center server 30 issues the authentication key according to a predetermined condition and distributes the authentication key to the mobile terminal 20.

The center server 30 acquires position information of the vehicle 10 from the vehicle 10. Accordingly, the center server 30 can figure out the position of the vehicle 10.

The center server 30 operates the car sharing service for sharing the vehicle 10A among a plurality of regular users including the owner user of the vehicle 10A. Specifically, the center server 30 operates a service for sharing the authentication key of the vehicle 10A that each of a plurality of pre-registered regular users including the owner user can acquire in the mobile terminal 20 of the regular user (the mobile terminals 20Aa, 20Ab) (a key sharing service).

The center server 30 performs a registration process (a use registration process) of allowing the regular user of the vehicle 10A to use a service for using the vehicle 10A (a key sharing service, a vehicle cabin delivery service, a C2C car sharing service, or the like). Specifically, the center server 30 registers an authority to distribute the authentication key to the predetermined mobile terminal 20 (hereinafter simply referred to as an "authentication key arrangement authority") by a key sharing management unit 3207 or a service management server 40 to be described below transmitting an authentication key arrangement request to be described below in order for the regular user of the vehicle 10A to use the service for using the vehicle 10A.

The center server 30 manages a use situation of the vehicle 10A through a plurality of services (that is, a plurality of companies) through a vehicle cabin delivery service, a C2C car sharing service, and the like to be described below.

The service management server 40 operates and manages various services that are provided using the vehicle 10. The service management server 40 includes a delivery management server 50 and an electronic commerce (EC) server 60 corresponding to the vehicle cabin delivery service, a C2C car sharing management server 70 corresponding to the C2C car sharing service, a B2C car sharing management server 80 corresponding to the B2C car sharing service.

The vehicle cabin delivery service may include a delivery service in which a product ordered at an EC site to be described below is a delivery target, and a delivery service in which a product other than the product ordered at the EC site is a delivery target. For example, the vehicle cabin delivery service in which the product other than the product ordered at the EC site is the delivery target is a service in which the regular user of the vehicle 10A can change a delivery destination to the trunk of the vehicle 10A when there is a notification indicating that a package destined for a house is scheduled to be delivered, from the delivery management server 50 to the regular user of the vehicle 10A through an e-mail, an SNS account, or a specific application program activated at mobile terminals 20Aa, 20Ab. Hereinafter, in the embodiment, description will be given while focusing on the vehicle cabin delivery service in which the product ordered at the EC site is the delivery target. An operation of each configuration related to the vehicle cabin delivery service to be described below can be appropriately applied to an operation of each configuration in the vehicle cabin delivery service in which the product other than the product ordered at the EC site is the delivery target.

The delivery management server 50 is communicably connected to the mobile terminal 20Ac and the center server 30 over a predetermined communication network, and performs an operation and management of a distribution system related to the vehicle cabin delivery service from reception of the package to the delivery of the package to the trunk of the vehicle 10A.

A delivery company operating the delivery management server 50 may provide the regular user of the vehicle 10A with a delivery service in which a vehicle cabin other than the trunk of the vehicle 10A can be designated as a delivery destination in place of the trunk of the vehicle 10A or in addition to the trunk of the vehicle 10A. Hereinafter A delivery service in which the vehicle cabin (that is, the inside of the vehicle 10A) including the trunk of the vehicle 10A can be designated as the delivery destination is referred to as a "vehicle cabin delivery service". The delivery company operating the delivery management server 50 may provide the regular user of the vehicle 10A with a pick-up service in which the vehicle cabin including the trunk can be designated as a package pick-up point (hereinafter simply referred to as a "vehicle cabin pick-up service"), as well as the vehicle cabin delivery service. That is, the delivery management server 50 may perform an operation and management of the vehicle cabin pick-up service in place of the vehicle cabin delivery service or in addition to the vehicle cabin delivery service. In this case, the package that is a package pick-up target may be a product (that is, a product purchased at the EC site) returning to an operating company of the EC site corresponding to the EC server 60 (or a store opened at the EC site) or may be a package for delivery not related to the EC site. The vehicle cabin pick-up service may be realized as a pick-up service when a company (for example, a laundry company) that provides a service in a form of temporarily keeping products from a customer keeps a package from the regular user of the vehicle 10A. In this case, a laundry company or the like may provide a pick-up management server that operates and manages the vehicle cabin pick-up service, which can be included in the service management server 40, as in the delivery management server 50. That is, the pick-up management server may be provided, in place of the delivery management server 50 or in addition to the delivery management server 50. A recovery service in which the vehicle cabin of the vehicle 10A can be designated as a recovery point of articles that are recovery targets (hereinafter simply referred to as a "vehicle cabin recovery service") may be provided to the regular user of the vehicle 10A by a company that provides a service in a form of recovering predetermined articles (articles such as waste or goods desired to be purchased, e.g. second-hand book) from customers (for example, a waste collection company or an antique purchase company). In this case, a recovery management server that operates and manages the vehicle cabin recovery service, which may be included in the service management server 40, may be provided by a waste recovery company or the like, similar to the delivery management server 50. That is, the recovery management server may be provided, in place of the delivery management server 50 or in addition to the delivery management server 50.

The EC server 60 is communicably connected to the center server 30 and the delivery management server 50 over a predetermined communication network, and operates a predetermined website (an EC site) for selling products or services. Specifically, the EC server 60 displays the trunk of the vehicle 10A as an optional delivery destination on a webpage for inputting information on the order of the product of the EC site (hereinafter simply referred to as an "order input page"), which is accessed via a browser activated in a user terminal (for example, the mobile terminals 20Aa, 20Ab, etc.), for the regular user of the vehicle 10A and the predetermined delivery company, which are registered in advance (in the embodiment, the delivery company corresponding to the delivery management server 50). Consequently, the regular user of the vehicle 10A can request the delivery company to deliver the purchased product to the trunk of the vehicle 10A, for example, which is parked in a parking lot near his/her home or parked in a parking area of the office for traveling to work even when he/she is not at home.

The C2C car sharing management server 70 is communicably connected to the mobile terminal 20Ad and the center server 30, and performs an operation and management of the C2C car sharing service that assists in lending and borrowing of the vehicle 10A between individuals. For example, the C2C car sharing management server 70 performs an operation and management of the C2C car sharing service such as reception of registration of a date and time when the vehicle 10A can be lent by the owner user, reception of reservation of use from a person who wants to borrow the vehicle 10A, and arrangement of the authentication key of the vehicle 10A. The C2C car sharing management server 70 may operate and manage the C2C trunk sharing service in an aspect in which the inside of the vehicle cabin of the vehicle 10A of an individual or the trunk thereof is lent as a temporary package storage place, a package delivery destination, or the like.

The B2C car sharing management server 80 is communicably connected to the mobile terminal 20B and the center server 30, and performs an operation and management of the B2C car sharing service in which the vehicle 10B owned by a predetermined company (for example, a provider of the B2C car sharing service) is lent in an aspect in which the vehicle 10B can be shared among a plurality of general consumers. For example, the B2C car sharing management server 80 performs an operation and management of the B2C car sharing service such as reception of reservation of use of the vehicle 10B, and arrangement of a parking position of the vehicle 10B and the authentication key of the vehicle 10B. The B2C car sharing management server 80 may operate and manage the B2C trunk sharing service in an aspect in which the inside of the vehicle cabin of the vehicle 10B or the trunk is lent as a temporary package storage space or a package delivery destination.

A company car use management server that operates a car sharing service (a company car use management service) in which an employee of a company is a borrower, with the vehicle 10 as a company car of the company being a reservation of use target, may be included in the service management server 40, instead of the B2C car sharing management server 80 or in addition to the B2C car sharing management server 80. In this case, when there is an idle time period of the vehicle 10, which is the company car, the C2C car sharing management server 70 may operate the C2C car sharing service, with the vehicle 10 as a company car being a borrowing target. The delivery management server 50 and the EC server 60 may operate the vehicle cabin delivery service in which a delivery destination of a package to be delivered to a company can be designated as a trunk of the vehicle 10 that is a company car of the company.

Details of Configuration Regarding Locking, Unlocking, and Activation of Vehicle A configuration regarding locking, unlocking, and activation of vehicle 10 in the authentication key management system 1 will be described with reference to FIG. 2.

Figure 2:
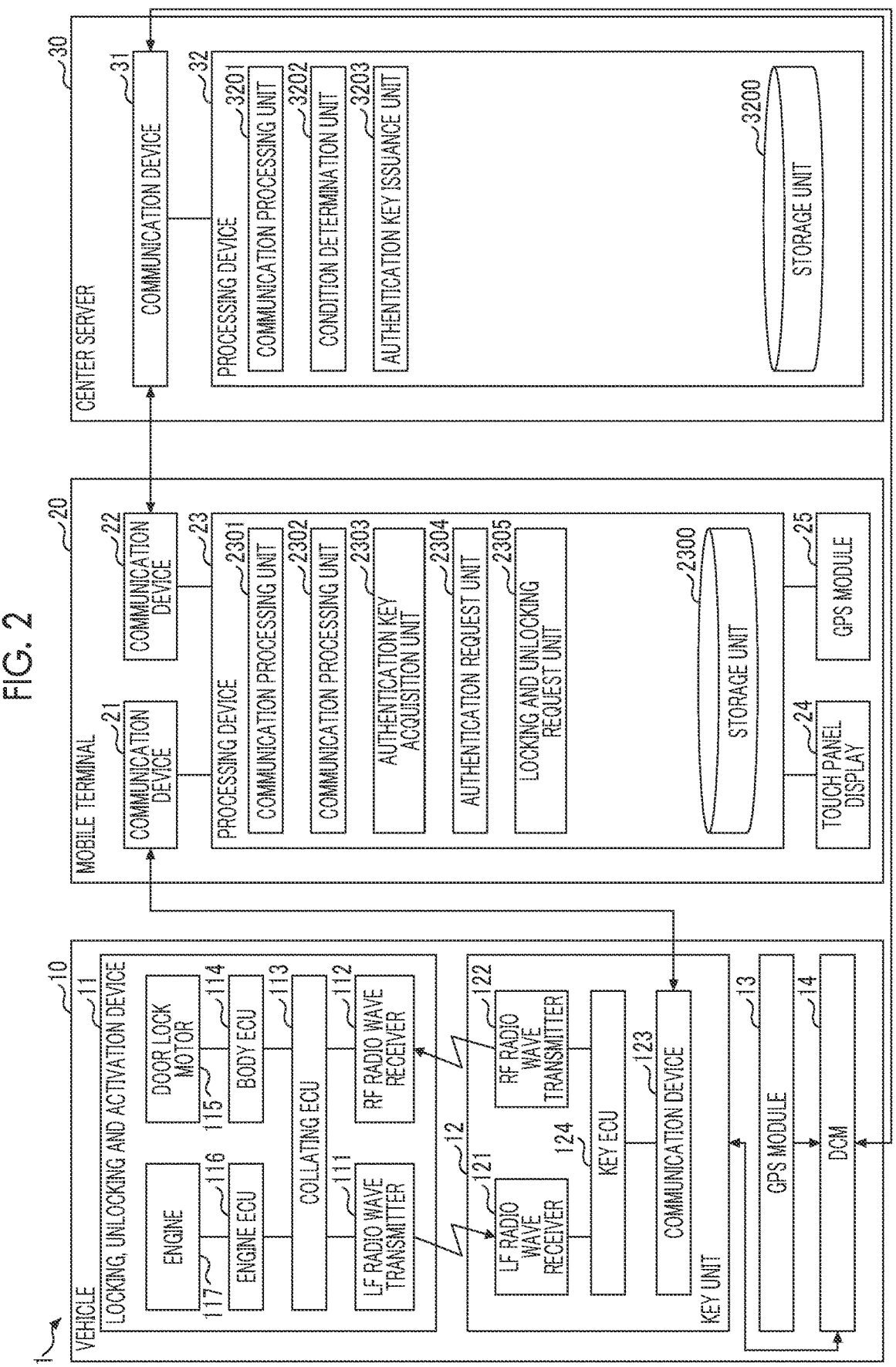
FIG. 2 is a diagram mainly illustrating an example of a configuration regarding locking and unlocking of a vehicle in the authentication key management system.

FIG. 2 is a diagram mainly illustrating an example of the configuration regarding locking, unlocking, and activation of the vehicle 10 in the authentication key management system 1. The vehicle 10 includes a locking, unlocking and activation device 11, a key unit 12, a global positioning system (GPS) module 13, and a data communication module (DCM) 14.

The locking, unlocking and activation device 11 is attached to the vehicle 10 and performs unlocking and locking of the doors of the vehicle 10 according to a locking signal and an unlocking signal to be transmitted as radio waves in a radio frequency (RF) band (for example, 300 MHz to 3 GHz) (hereinafter referred to as "RF radio waves") from the key unit 12. The locking, unlocking and activation device 11 activates the vehicle 10 according to exchange using radio waves in a low frequency (LF) band (for example, 30 Hz to 300 kHz) (hereinafter simply referred to as "LF radio waves") and RF radio waves with the key unit using a pressing manipulation of an activation switch (not illustrated) provided in the vehicle cabin of the vehicle 10 as a trigger. The locking, unlocking and activation device 11 includes an LF radio wave transmitter 111, an RF radio wave receiver 112, a collating electronic control unit (ECU) 113, a body ECU 114, a door lock motor 115, an engine ECU 116, and an engine 117 as a driving power source of the vehicle 10.

The locking, unlocking and activation device 11 operates with power supplied from an auxiliary battery (not illustrated) mounted on the vehicle 10.

The LF radio wave transmitter 111 is embedded into, for example, a center console or a door handle in the vehicle cabin, and transmits LF radio waves under the control of the collating ECU 113.

The RF radio wave receiver 112 is provided, for example, in a trim of a luggage compartment of the vehicle 10 and receives RF radio waves under the control of the collating ECU 113.

The collating ECU 113 is an electronic control unit that controls locking and unlocking of the doors of the vehicle 10 and activation of the vehicle 10 based on exchange of signals with the key unit 12. The collating ECU 113 is realized by any hardware, any software, or a combination of any hardware and any software. For example, the collating ECU 113 is configured mainly of a microcomputer includes a central processing unit (CPU), a random access memory (RAM), a read only memory (ROM), an auxiliary storage device, a real time clock (RTC), and a communication interface. The collating ECU 113 realizes various control processes by executing various programs stored in the ROM or the auxiliary storage device on the CPU. Hereinafter, the same applies to the key ECU 124 to be described below.

The collating ECU 113 receives an unlocking signal and a locking signal transmitted as RF radio waves from the key unit 12 using the RF radio wave receiver 112.

When the collating ECU 113 receives the unlocking signal or the locking signal, the collating ECU 113 performs authentication of a transmission source (the key unit 12) of the unlocking signal or the locking signal based on key information included in the unlocking signal or the locking signal (hereinafter simply referred to as "internal key information"). For example, when the internal key information registered in an internal memory such as an auxiliary storage device in advance matches the internal key information included in the unlocking signal or the locking signal, the collating ECU 113 determines that the authentication is successful, and when the internal key information registered in the internal memory such as the auxiliary storage device in advance does not match the internal key information included in the unlocking signal or the locking signal, the collating ECU 113 determines that the authentication fails.

For example, the collating ECU 113 may transmit LF radio waves including a "challenge" created in a predetermined method using the internal key information of the internal memory from the LF radio wave transmitter 111 to the key unit 12 and perform challenge response authentication based on a "response" replied from the key unit 12, which is received from the RF radio wave receiver 112.

When the authentication is successful, the collating ECU 113 transmits an unlocking command (upon reception of the unlocking signal) or a locking command (upon reception of the locking signal) to the body ECU 114 via an in-vehicle network such as a controller area network (CAN).

Moreover, the collating ECU 113 transmits a notification that the door is unlocked or locked (an unlocking notification or a locking notification) to the key unit 12 via the LF radio wave transmitter 111 when a reply indicating that the door is normally unlocked or locked (an unlocking reply or a locking reply) is received from the body ECU 114 via the in-vehicle network such as the CAN after the collating ECU 113 transmits the unlocking command or and locking command to the body ECU 114.

As will be described below, in the unlocking signal, solely some of the doors of the vehicle 10 may be designated as unlocked targets. In this case, the collating ECU 113 designates the door as an unlocked target in the unlocking command. Accordingly, the body ECU 114 can operate solely the door lock motor 115 corresponding to some designated doors and unlock solely some doors.

When the above-described activation switch is pressed, the collating ECU 113 performs authentication of the key unit 12 by exchanging signals with the key unit 12 using the LF radio wave transmitter 111 and the RF radio wave receiver 112.

For example, the collating ECU 113 transmits a request signal in an LF band from the LF radio wave transmitter 111 to the key unit 12 to request reply of the internal key information. When a response signal including the internal key information is received from the key unit 12 by the RF radio wave receiver 112, the collating ECU 113 determines authentication success or authentication failure based on matching between the internal key information registered in the internal memory in advance and the internal key information included in the response signal, as in a case of locking and unlocking the doors.

For example, the collating ECU 113 may perform challenge response authentication, as in a case of locking and unlocking of doors.

When the authentication has succeeded, the collating ECU 113 transmits a startup command of the engine 117 to the engine ECU 116 through the in-vehicle network such as the CAN.

The body ECU 114 is an electronic control unit that performs operation control of the door lock motor 115 that is communicably connected via a one-to-one communication line or the like. The body ECU 114 outputs a control command to cause the door lock motor 115 to perform an unlocking operation according to the unlocking command from the collating ECU 113. The body ECU 114 outputs a control command to cause the door lock motor 115 to perform a locking operation according to the locking command from the collating ECU 113. Furthermore, the body ECU 114 transmits the unlocking reply or the locking reply to the collating ECU 113 via the in-vehicle network such as the CAN when the door is normally unlocked or locked by outputting the control command to the door lock motor 115.

The door lock motor 115 is a known electric actuator that unlocks and locks the doors of the vehicle 10 according to the control command from the body ECU 114.

The engine ECU 116 is an electronic control unit that drives and controls the engine 117. Specifically, the engine ECU 116 drives and controls various actuators such as a starter or an injector, which are mounted on the engine 117. When the startup command is input from the collating ECU 113, the engine ECU 116 outputs a control command to various actuators such as a starter or an injector of the engine 117 to start up the engine 117.

The key unit 12 is disposed in the vehicle cabin of the vehicle 10 and transmits the unlocking signal and the locking signal as RF radio waves to the locking, unlocking and activation device 11 according to the unlocking request and the locking request transmitted from the mobile terminal 20. The key unit 12 performs exchange of signals with the locking, unlocking and activation device 11 according to the signal in the LF band transmitted from the locking, unlocking and activation device 11 when the activation switch provided in the vehicle cabin of the vehicle 10 is pressed. The key unit 12 includes an LF radio wave receiver 121, an RF radio wave transmitter 122, a communication device 123, and a key ECU 124.

The key unit 12 may be disposed at a position (for example, a glove box, or the inside of a center console box) at which it is difficult for users seated on respective seats of the vehicle 10 to visually recognize the key unit 12. The key unit 12 may be fixed or may not be fixed to the vehicle 10. The key unit 12 may be operated by a built-in button battery or the like or may be operated by power supplied from an auxiliary battery mounted on the vehicle 10.

The LF radio wave receiver 121 receives the LF radio waves under the control of the key ECU 124.

The RF radio wave transmitter 122 transmits RF radio waves under the control of the key ECU 124.

The communication device 123 is any device that performs near field communication with the mobile terminal 20 under the control of the key ECU 124. The communication device 123 may be, for example, a BLE communication module that performs communication with the mobile terminal 20 in compliance with a Bluetooth (registered trademark) low energy (BLE) communication standard. Hereinafter, description will be given on the premise that a communication standard adopted in the communication device 123 conforms to BLE communication.

The communication device 123 may be a communication device conforming to a short-range communication standard having a very short communicable distance, such as a near field communication (NFC) standard. In this case, the communication device 123 may be built, for example, at a position (for example, the inside of the door handle) close to a body surface of the vehicle 10 outside the vehicle cabin. Accordingly, the key unit 12 (the key ECU 124) can communicate with the mobile terminal 20 outside the vehicle cabin even when the communicable distance of the communication device 123 is very short.

The key ECU 124 is an electronic control unit that performs a control process of transmitting a locking signal and an unlocking signal to the locking, unlocking and activation device 11 according to the unlocking request and the locking request received from the mobile terminal 20.

The key ECU 124 controls the communication device 123 and establishes a state in which communication according to a predetermined communication standard with the mobile terminal 20, such as a BLE communication standard is possible.

Specifically, the key ECU 124 periodically (for example, every several seconds) transmits an advertising packet including advertisement information reachable in a predetermined communication range (for example, several meters to tens of meters) from the communication device 123. The advertisement information includes a universally unique identifier (UUID) corresponding to the key unit 12, a device identifier (ID), and the like. Accordingly, the mobile terminal 20 can identify the key unit 12 mounted on the vehicle 10 that is a target by receiving the advertising packet and confirming the advertisement information.

When a connection request for requesting connection based on the BLE communication is received from the mobile terminal 20 present in a communication range of the vehicle 10 (the key unit 12) that has received the advertising packet, the key ECU 124 establishes a state in which BLE communication between the mobile terminal 20 and the vehicle 10 (the key unit 12) is possible. In this case, the key ECU 124 transmits a connection response indicating that the state in which the BLE communication is possible has been established, to the mobile terminal 20 via the communication device 123.

The key ECU 124 receives an authentication request including an authentication key associated with the key unit 12 from the mobile terminal 20 via the communication device 123 in a state in which the above-described BLE communication is established.

When the authentication request including the authentication key associated with the key unit 12 is received from the mobile terminal 20, the key ECU 124 performs authentication of the mobile terminal 20 based on the authentication key. When the authentication has been successful, the key ECU 124 restores the internal key information stored in an internal memory such as an auxiliary storage device to a usable state. The internal key information is stored in a state that the internal key information cannot be used for authentication in the locking, unlocking and activation device 11, for example, due to a state in which the internal key information is not accessible or a state in which the internal key information has been encrypted. Therefore, when the authentication of the mobile terminal 20 has been successful, the key ECU 124, for example, performs changing of an authority to access the internal memory for changing the key information to an accessible state, or decodes encrypted internal key information based on the authentication key. Accordingly, the key ECU 124 can access the internal key information which is not normally accessible to transmit an unlocking signal or a locking signal including the internal key information to the locking, unlocking and activation device 11 or transmit an unlocking signal or a locking signal including decoded internal key information to the locking, unlocking and activation device 11. Therefore, the locking, unlocking and activation device 11 can perform appropriate authentication based on the internal key information included in the unlocking signal and the locking signal. Even when a situation in which a malicious third party illegally obtains the key unit 12 occurs, the internal key information in the key unit 12, for example, is not accessible or is encrypted, occurrence of theft of the vehicle 10 can be suppressed.

The key ECU 124 receives the unlocking request and the locking request from the mobile terminal 20 via the communication device 123 in a state in which the above-described BLE communication is established. When the authentication of the mobile terminal 20 is successful (specifically, a state in which the BLE communication has been established is kept after the authentication of the mobile terminal 20 has been successful) and the key ECU 124 has received the unlocking request or the locking request from the mobile terminal 20, the key ECU 124 transmits the unlocking signal or the locking signal including locking and unlocking key information to the locking, unlocking and activation device 11 via the RF radio wave transmitter 122.

Accordingly, unlocking or locking of the doors of the vehicle 10 is realized after an authentication process in the locking, unlocking and activation device 11.

Furthermore, the key ECU 124 transmits to an unlocking completion notification to the mobile terminal 20 in which the BLE communication is established, i.e. the mobile terminal 20 which is the transmission source of the unlocking request, via the communication device 123 in a case of receiving the unlocking notification from the locking, unlocking and activation device 11 via the LF radio wave receiver 121 after transmitting the unlocking signal to the locking, unlocking and activation device 11. Similarly, the key ECU 124 transmits to a locking completion notification to the mobile terminal 20 in which the BLE communication is established via the communication device 123 in a case of receiving the locking notification from the locking, unlocking and activation device 11 via the LF radio wave receiver 121 after transmitting the locking signal to the locking unlocking and activation device 11. Accordingly, the mobile terminal 20, which is the transmission source of the locking request or the unlocking request based on the predetermined manipulation, can figure out that the locking or unlocking of the vehicle 10A has been normally completed.

As described above, the key ECU 124 performs exchange of signals with the locking, unlocking and activation device 11 according to a signal in the LF band transmitted from the locking, unlocking and activation device 11 when the activation switch provided in the vehicle cabin of the vehicle 10 is pressed.

For example, when the request signal is received from the locking, unlocking and activation device 11 by the LF radio wave receiver 121, the key ECU 124 transmits a response signal including the internal key information stored in the internal memory or the like to the locking, unlocking and activation device 11 via the RF radio wave transmitter 122.

For example, when the LF radio waves including the "challenge" are received from the locking, unlocking and activation device 11 by the LF radio wave receiver 121, the key ECU 124 generates a "response" based on the internal key information and transmits the response to the locking, unlocking and activation device 11 via the RF radio wave transmitter 122.

Accordingly, after the authentication process in the locking, unlocking and activation device 11, the startup of the engine 117 is realized.

An authority regarding a function of locking, unlocking, or activating the vehicle 10 imparted by the center server 30 may be defined in the authentication key.

For example, when the authentication key has solely the authority to unlock some of the doors of the vehicle 10, the key ECU 124 transmits an unlocking signal including information for designating the door to be unlocked to the key unit 12 via the RF radio wave transmitter 122. Accordingly, solely some of the doors of the vehicle 10 can be unlocked as described above.

For example, when the authentication key does not have the authority to activate the engine 117, the key ECU 124 may not perform exchange with the locking, unlocking and activation device 11 even when the signal in the LF band from the locking, unlocking and activation device 11 based on a pressing manipulation of the activation switch is received by the LF radio wave receiver 121. Accordingly, it is possible to prohibit the activation of the engine 117 according to the authority of the authentication key.

The GPS module 13 receives GPS signals transmitted from three or more satellites and, desirably, four or more satellites over the vehicle 10, and measures a position of the vehicle 10. The GPS module 13 is communicably connected to the DCM 14 or the like via a one-to-one communication line or an in-vehicle network such as a CAN, and the measured position information of the vehicle 10 is input to the DCM 14 or the like.

The DCM 14 is a communication device that bidirectionally communicates with the center server 30 over a predetermined communication network. The DCM 14 transmits current position information of the vehicle 10 input from the GPS module 13 to the center server 30 at a predefined timing or according to a request from the center server 30, or the like. The DCM 14 transmits, to the center server 30, various types of vehicle information (for example, information indicating that unlocking of the door of the vehicle 10 or activation of the vehicle 10 is performed based on the authentication key, which is acquired from the key unit 12) that can be acquired over an in-vehicle network such as a CAN at a predefined timing or according to a request from the center server 30 or the like.

The mobile terminal 20 includes a communication device 21, a communication device 22, a processing device 23, a touch panel display (hereinafter simply referred to as a "display") 24, and a GPS module 25.

The communication device 21 is any device that performs near field communication with the mobile terminal 20 according to the same communication standard as that of the communication device 123. As described above, in a case of the embodiment, the communication device 21 is, for example, a BLE communication module.

The communication device 22 is any device that communicates with the center server 30, the service management server 40, or the like over a predetermined communication network. The communication device 22 is a mobile communication module corresponding to a communication standard such as Long Term Evolution (LTE), 4th Generation (4G), or 5th Generation (5G).

The processing device 23 performs various control processes in the mobile terminal 20. The functions of the processing device 23 may be realized by any hardware, any software, or a combination of any hardware and any software, and includes for example, a CPU, a RAM, a ROM, an auxiliary storage device, an RTC, and various interfaces for communication. The processing device 23 includes, for example, a communication processing unit 2301, a communication processing unit 2302, an authentication key acquisition unit 2303, an authentication request unit 2304, and a locking and unlocking request unit 2305 as functional units that are realized by executing one or more programs stored in the ROM or the auxiliary storage device on the CPU. The processing device 23 includes, for example, a storage unit 2300 that is realized as a storage area in the auxiliary storage device, and a process of storing various pieces of data in the storage unit 2300 is realized by a predetermined program stored in the ROM or the auxiliary storage device.

The communication processing unit 2301 performs bidirectional near field communication with the key unit 12 using the communication device 21 and performs transmission and reception of various signals.

The communication processing unit 2302 connects to the predetermined communication network using the communication device 22 and transmits and receives various signals such as a data signal or a control signal to and from the center server 30, the service management server 40, and the like.

The authentication key acquisition unit 2303 acquires the authentication key from the center server 30, for example, according to a predetermined manipulation of the user with respect to a predetermined graphical user interface (GUI) displayed on the display 24, and stores the acquired authentication key in the storage unit 2300. Hereinafter, the description will be given on the premise that various manipulations with respect to the mobile terminal 20 are performed by a manipulation with respect to the GUI displayed on the display 24 in conjunction with the operation of the key application.

For example, the authentication key acquisition unit 2303 of the mobile terminal 20Aa transmits an authentication key acquisition request to the center server 30 via the communication processing unit 2302. Accordingly, the center server 30 receives the authentication key acquisition request, and issues the authentication key when the center server 30 determines that the authentication key acquisition request is a regular authentication key acquisition request. The authentication key acquisition unit 2303 acquires the authentication key distributed from the center server 30 via the communication processing unit 2302.

For example, the authentication key acquisition unit 2303 of the mobile terminal 20Ab acquires the authentication key distributed from the center server 30 to the mobile terminal 20Ab via the communication processing unit 2302 according to a key sharing request (to be described below) transmitted from the mobile terminal 20Aa to the center server 30.

The authentication key acquisition unit 2303 of the mobile terminal 20Ab may transmit the authentication key acquisition request by itself to the center server 30 via the communication processing unit 2302. In this case, when the center server 30 receives the authentication key acquisition request from the mobile terminal 20Ab, the center server 30 may perform an inquiry about whether or not to permit distribution of the authentication key to the mobile terminal 20Aa of the owner user.

For example, the authentication key acquisition unit 2303 of each of the mobile terminals 20Ac, 20Ad, 20B transmits an authentication key acquisition request to the delivery management server 50, the C2C car sharing management server 70, and the B2C car sharing management server 80 to request acquisition of the authentication key. Accordingly, the delivery management server 50, the C2C car sharing management server 70, and the B2C car sharing management server 80 transmit an authentication key arrangement request to the center server 30 according to reception of the authentication key acquisition request, and the center server 30 issues the authentication key according to reception of the authentication key arrangement request. The authentication key acquisition unit 2303 acquires the authentication key distributed from the center server 30 via the communication processing unit 2302.

The authentication key acquisition unit 2303 of the mobile terminals 20Ac, 20Ad, 20B may transmit the authentication key acquisition request to the center server 30 via the communication processing unit 2302. In this case, the center server 30 may perform an inquiry of the delivery management server 50, the C2C car sharing management server 70, and the B2C car sharing management server 80 to determine whether or not the authentication key acquisition request is a regular authentication key acquisition request.

The authentication request unit 2304 transmits an authentication request to the key unit 12 of the vehicle 10 via the communication processing unit 2301 to request authentication of the mobile terminal 20 serving as a remote manipulation unit for locking and unlocking the doors of the vehicle 10. For example, when the authentication request unit 2304 finds a key unit corresponding to the authentication key, and specifically, when an advertising packet corresponding to the key unit 12 is received by the communication processing unit 2301, the authentication request unit 2304 may transmit the authentication request to the key unit 12. For example, the authentication request unit 2304 may transmit the authentication request to the key unit 12 according to a predetermined manipulation by the user.

The locking and unlocking request unit 2305 transmits an unlocking request including an authentication key or a locking request including the authentication key to the key unit 12 via the communication processing unit 2301 according to the predetermined manipulation by the user. Accordingly, even when the unlocking request or the locking request has been transmitted to the key unit 12 before the authentication request is transmitted by the authentication request unit 2304, locking and unlocking of the door of the vehicle 10 based on the authentication process in the key unit 12 can be realized. For example, an unlocking button for requesting unlocking of the vehicle 10 and a locking button for requesting locking of the vehicle 10 may be drawn in a GUI serving as a manipulation screen of the display 24, a locking request may be transmitted when the locking button is touched, and an unlocking request may be transmitted when the unlocking button is touched. The locking request and the unlocking request may be transmitted by a manipulation with respect to a predetermined manipulation unit by hardware provided in the mobile terminal 20.

For example, the functions of the authentication key acquisition unit 2303, the authentication request unit 2304, and the locking and unlocking request unit 2305 may be available to the user by a predetermined application program installed in the ROM of the processing device 23, the auxiliary storage device, or the like being activated. Hereinafter, the description will be given on the premise that the functions of the authentication key acquisition unit 2303, the authentication request unit 2304, and the locking and unlocking request unit 2305 of the processing device 23 are available to the user by the key application already installed in the processing device 23 (the auxiliary storage device or the ROM) being activated.

The display 24 is, for example, a liquid crystal display or an organic electroluminescence (EL) display, and is a display device which is provided on a front surface of the mobile terminal 20 and also serving as a known touch panel type manipulation unit.

The GPS module 25 receives GPS signals transmitted from three or more satellites and, preferably, four or more satellites above the mobile terminal 20, and measures the position of the mobile terminal 20. The position measurement information (position information of the mobile terminal 20) of the GPS module 25 is input to the processing device 32.

The mobile terminal 20 may measure the position of the mobile terminal 20 through base station position measurement based on wireless communication with a plurality of base stations.

The center server 30 includes a communication device 31 and a processing device 32.

The functions of the center server 30 may be shared and realized by a plurality of servers. Hereinafter, the same applies to the delivery management server 50, the EC server 60, the C2C car sharing management server 70, and the B2C car sharing management server 80.

The communication device 31 is any device that performs bidirectional communication with each of the vehicle 10, the mobile terminal 20, and the service management server 40 over a predetermined communication network.

The processing device 32 performs various control processes in the center server 30. The functions of the processing device 32 may be realized by any hardware, any software, or a combination of any hardware and any software, and the processing device 32 is mainly configured of one or a plurality of server computers including, for example, a CPU, a RAM, a ROM, an auxiliary storage device, an RTC, and a predetermined communication interface. Hereinafter, the same applies to processing devices 52, 62, 72, 82 to be described below of the delivery management server 50, the EC server 60, the C2C car sharing management server 70, and the B2C car sharing management server 80. The processing device 32 includes, for example, a communication processing unit 3201, a condition determination unit 3202, and an authentication key issuance unit 3203 as functional units that are realized by executing one or more programs stored in the ROM or the auxiliary storage device on the CPU. The processing device 32 includes, for example, a storage unit 3200 that is realized as a storage area defined in an auxiliary storage device of a server computer or an external storage device connected to the server computer, and a process in which various pieces of data are stored in the storage unit 3200 is realized by a program stored in the ROM or the auxiliary storage device. Hereinafter, the same applies to the storage units 520, 620, 720, 820 to be described below.

The communication processing unit 3201 controls the communication device 31 to perform exchange of various signals such as control signals and information signals with the vehicle 10, the mobile terminal 20, and the service management server 40.

The condition determination unit 3202 determines whether or not the authentication key acquisition request or the authentication key arrangement request is a regular authentication key acquisition request or a regular authentication key arrangement request according to reception of an authentication key acquisition request from the mobile terminal 20 or an authentication key arrangement request from the service management server 40 received by the communication processing unit 3201.

When the condition determination unit 3202 determines that the authentication key acquisition request or the authentication key arrangement request is the regular one, the authentication key issuance unit 3203 specifies a specification of the authentication key to be issued and issues an authentication key corresponding to the specified specification. For example, the authentication key issuance unit 3203 specifies the vehicle 10 that is a target of locking and unlocking using the authentication key or the key unit 12 corresponding to the vehicle 10. For example, the authentication key issuance unit 3203 specifies the authority of the authentication key regarding a period of time in which the authentication key is valid (available) and the number of times the authentication key is available. For example, the authentication key issuance unit 3203 specifies the authority of the authentication key regarding the unlocking or activation of the vehicle 10, such as lockable and unlockable doors and whether or not the vehicle 10 can be activated. For example, the authentication key issuance unit 3203 specifies the authority of the authentication key regarding the temporary key sharing, such as whether or not the authentication key can be shared with another mobile terminal 20 through a temporary key sharing to be described below, a period of time in which the authentication key can be shared with the other mobile terminal 20, and the number of times the authentication key can be shared with the other mobile terminal 20. Hereinafter, the authority of the authentication key regarding the period of time in which the authentication key is available, the number of times the authentication key is available, and the like, the authority of the authentication key regarding the unlocking or activation of the vehicle 10, and the authority of the authentication key regarding the temporary key sharing are collectively simply referred to as "various authorities of the authentication key". The authentication key issuance unit 3203 distributes the authentication key issued to the mobile terminal 20 that is a target via the communication processing unit 3201.

Details of Configuration Regarding Key Sharing Service

A configuration regarding the key sharing service in the authentication key management system 1 will be described with reference to FIG. 3.

Figure 3:
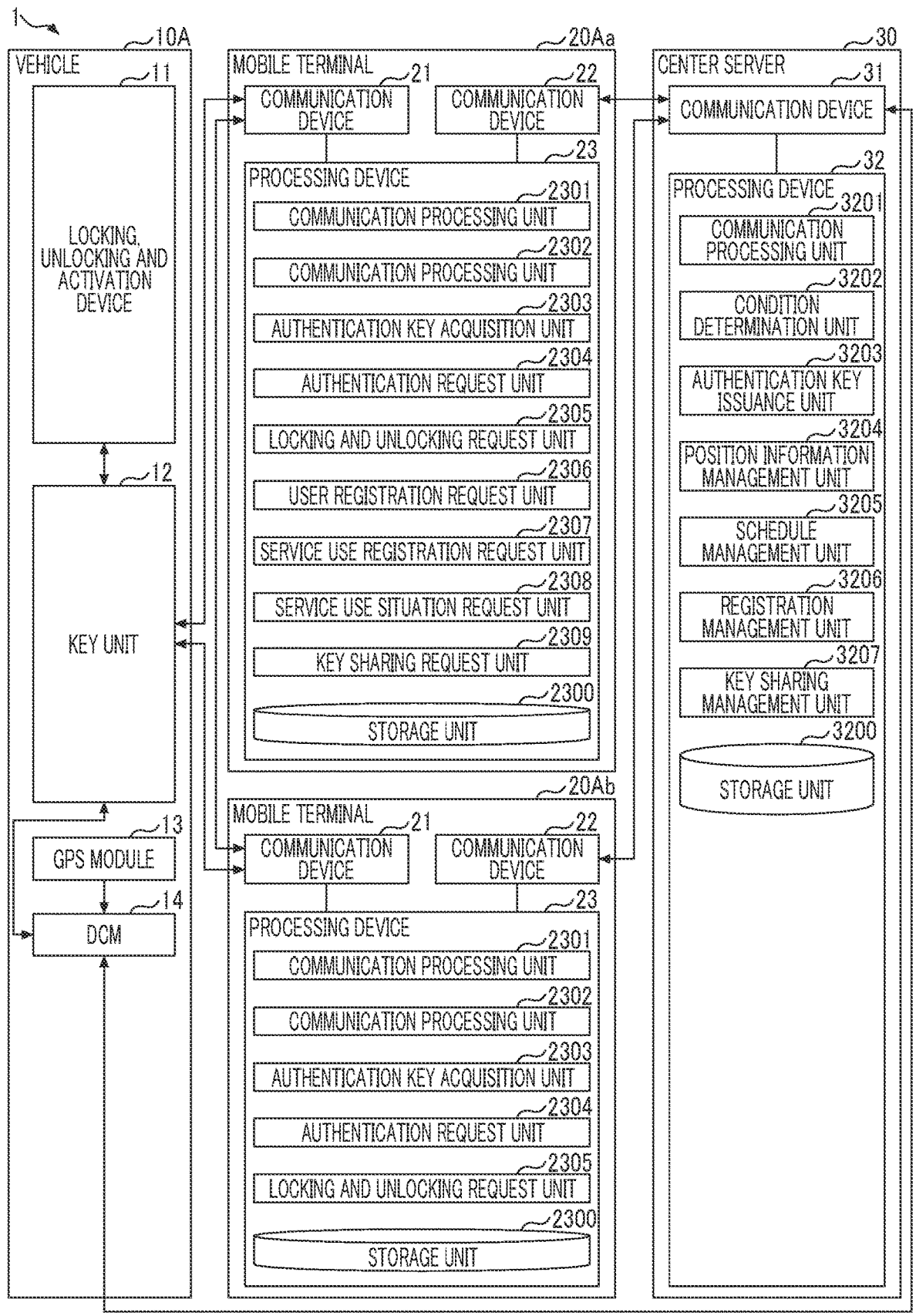
FIG. 3 is a diagram mainly illustrating an example of a configuration regarding a key sharing service in the authentication key management system.

FIG. 3 is a diagram mainly illustrating an example of a configuration regarding the key sharing service in the authentication key management system 1. Hereinafter, a configuration regarding the key sharing service in the authentication key management system 1 will be mainly described with reference to FIG. 3, and duplicate description on the configuration overlapping the configuration regarding locking, unlocking, and activation of the vehicle 10 described above will be omitted as much as possible. Hereinafter, the same applies to description of FIGS. 4 to 6.

The processing device 23 of the mobile terminal 20Aa carried by the owner user of the vehicle 10A includes the communication processing unit 2301, the communication processing unit 2302, the authentication key acquisition unit 2303, the authentication request unit 2304, and the locking and unlocking request unit 2305, as described above. The processing device 23 of the mobile terminal 20Aa further includes a user registration request unit 2306, a service use registration request unit 2307, a service use situation request unit 2308, and a key sharing request unit 2309 as functional units that are realized by executing one or more programs stored in the ROM or the auxiliary storage device on the CPU.

In the embodiment, the description will be given on the premise that the functions of the user registration request unit 2306, the service use registration request unit 2307, the service use situation request unit 2308, and the key sharing request unit 2309 of the mobile terminal 20Aa are available to the owner user by the key application being activated and the user authentication based on bidirectional communication with the center server 30 being successful. The description will be given on the premise that the user authentication is performed by the center server 30 based on an ID defined for the owner user (hereinafter simply referred to as an "owner user ID") in advance and a password corresponding to the owner user ID.

The user registration request unit 2306 requests the center server 30 to register the regular user of the vehicle 10A that uses various services (the key sharing service, the vehicle cabin delivery service, the C2C car sharing service, and the like) for using the vehicle 10A, according to a predetermined manipulation by the owner user. For example, the user registration request unit 2306 transmits a user registration request including an owner user ID and a password and attribute information (for example, a name, age, and relationship with the owner user) for specifying a sub-user who is a registration target to the center server 30 via the communication processing unit 2302.

When a notification indicating that registration of the sub-user has been completed (user registration completion notification) is received from the center server 30 by the communication processing unit 2302, the user registration request unit 2306 stores an ID (hereinafter simply referred to as a "sub-user ID") and a password of the sub-user included in the user registration completion notification in the storage unit 2300. In this case, the user registration request unit 2306 may transmit the sub-user ID and the password to the mobile terminal 20Ab carried by the registered sub-user via the communication processing unit 2301 according to a predetermined manipulation by the owner user.

The service use registration request unit 2307 requests the center server 30 to perform registration of use of various services for using the vehicle 10A by the regular user of the vehicle 10A according to a predetermined manipulation by the owner user. That is, the service use registration request unit 2307 requests registration of the authentication key arrangement authority of the key sharing management unit 3207 or the service management server 40 corresponding to various services for allowing regular users of the vehicle 10A to use various services, as described above. For example, the service use registration request unit 2307 transmits a service use registration request including the owner user ID and the password, the information for specifying the vehicle 10A to be used for various services, the information for specifying the service that is a target, and the ID of the regular user who uses the target service (the owner user ID or the sub-user ID) to the center server 30 via the communication processing unit 2302. Hereinafter, the owner user ID and the sub-user ID may be collectively referred to as a "regular user ID". Accordingly, the service use registration request unit 2307 can register a sub-user who uses the key sharing service in the center server 30.

The service use registration request unit 2307 receives a notification that the use registration of the service based on the service use registration request has been completed from at least one of the center server 30 and the service management server 40 through the communication processing unit 2302. The service use registration request unit 2307 causes the display 24 to display an indication that the use registration of the specific service by the regular user of the vehicle 10A based on the predetermined manipulation by the owner user has been completed. Accordingly, the owner user can figure out that the use registration of the specific service by the regular user has been completed.

The service use situation request unit 2308 requests the center server 30 to provide information on the use situation of various services (service use situation information) including the key sharing service by the regular user of the vehicle 10A for which the use registration has been completed in a form corresponding to the owner user ID according to a predetermined manipulation by the owner user. For example, the service use situation request unit 2308 transmits a service use situation request including the owner user ID and the password to the center server 30 via the communication processing unit 2302. When the service use situation information received from the center server 30 by the communication processing unit 2302 is received, the service use situation request unit 2308 displays the service use situation information on the display 24. Accordingly, the owner user can centrally figure out the information on the use situation of each service by each of the regular users registered for use in the center server 30 in an aspect in which the information is linked to the owner user ID.

The key sharing request unit 2309 requests the center server 30 to distribute the authentication key for performing locking, unlocking or activating of the vehicle 10A to the sub-user registered for use in the key sharing service according to a predetermined manipulation by the owner user. For example, the key sharing request unit 2309 transmits a key sharing request including an owner user ID and a password, information for specifying the vehicle 10A that is a locking and unlocking target by the authentication key, and information (for example, a sub-user ID) for specifying the sub-user that is a distribution (sharing) target of the authentication key to the center server 30 via the communication processing unit 2302. When the key sharing request unit 2309 transmits the key sharing request, use period information (for example, a date and time of use start and a date and time of use end) regarding a period of time in which the authentication key set and distributed by a predetermined manipulation by the owner user is available may be included in the key sharing request. The key sharing request may include authority information on various authorities of the authentication key, such as an authority of the authentication key regarding a period of time in which the authentication key is available or the number of times the authentication key is available, an authority of the authentication key regarding the unlocking or activation of the vehicle, and an authority of the authentication key regarding temporary key sharing to be described below, which can be designated according to the predetermined manipulation by the owner user. Accordingly, as described below, when the authentication key available at the same time is shared among the mobile terminals 20, the owner user can appropriately set authority information such that use of the vehicle 10A by a user other than the owner user can be limited. Therefore, security of the vehicle 10A can be improved.

The key sharing request unit 2309 may set the mobile terminals 20 (that is, at least one of the mobile terminals 20Aa, 20Ab) of a plurality of regular users of the vehicle 10A as distribution targets and request the center server 30 to distribute the authentication key of which the periods of time in which the authentication key is available overlap according to the predetermined manipulation by the owner user. That is, in the key sharing request, the regular users that are authentication key distribution targets may be designated, or the owner users may be included among the regular users. In the key sharing request, the period of time in which the authentication key is available for each of the designated regular users may overlap. Accordingly, the authentication key of the vehicle 10A available at the same time can be shared by the regular users. Therefore, for example, when a plurality of persons gets on the vehicle 10A together and go out for travel, camp, or the like, each of passengers can lock and unlock the vehicle 10A without lending and borrowing the mobile terminal 20 in which the authentication key has been stored, and therefore, convenience for users can be improved.

Even when the key sharing request unit 2309 may share the distributed authentication key with another mobile terminal 20 (that is, the mobile terminal 20 in which the key application is installed) according to a predetermined manipulation by the owner user (hereinafter, a sharing aspect of the authentication key will be referred to as "temporary key sharing"). In this case, the other mobile terminal 20 may be the mobile terminal 20Ab of the sub-user or may be the mobile terminal 20 of a user other than the sub-user, that is, a user temporarily using the vehicle 10A.

For example, the key sharing request unit 2309 transmits the authentication key (more specifically, a copy of the authentication key) to another mobile terminal 20 via the communication processing unit 2301. Accordingly, the owner user of the vehicle 10A can share the authentication key with the other user even when a plurality of persons suddenly gets on the vehicle 10A together and go out for traveling or the like. It is possible to share the authentication key available at the same time with the other mobile terminal 20 directly from the mobile terminal 20Aa. Accordingly, for example, even when the mobile terminal 20Aa is at a place at which a communication situation in a wireless mobile communication network is poor or out of a communication range, the owner user of the vehicle 10A can share the authentication key with the other user.

In this case, the key sharing request unit 2309 may transmit the authentication key of which the authority regarding the period of time in which the authentication key is available or the number of times the authentication key is available or the authority regarding the unlocking or activation of the vehicle 10A, which is set based on the predetermined manipulation by the owner user or which is defined in advance, has been restricted, to the other mobile terminal 20 via the communication processing unit 2301. Specifically, for example, an authentication key with an authority to limit the period of time in which the authentication key is available or the number of times the authentication key is available to, for example, 30 minutes or once, or an authentication key with an authority, for example, solely to lock and unlock doors for getting on and off the vehicle 10A or prohibit activation of the vehicle 10A may be transmitted to another mobile terminal 20. Hereinafter, the same applies to the case of temporary key sharing that is performed via the center server 30. Accordingly, security of the vehicle 10A due to the temporary key sharing can be improved.

When the temporary key sharing is performed, the key sharing request unit 2309 may cause the authentication key to be distributed from the center server 30 to the other mobile terminal 20, as in a case of a normal key sharing. In this case, the key sharing request unit 2309 may transmit a temporary key sharing request including information (for example, an issued ID embedded in the authentication key) for specifying the distributed authentication key and information for designating the other mobile terminal 20 that is a distribution target to the center server 30 via the communication processing unit 2302, to cause the authentication key of the vehicle 10A to be distributed from the center server 30 to the other mobile terminal 20.

For example, when the other mobile terminal 20 is the mobile terminal 20Ab of the sub-user, the key sharing request unit 2309 may transmit a temporary key sharing request including the sub-user ID to the center server 30 via the communication processing unit 2302.

For example, the key sharing request unit 2309 acquires predetermined identification information (for example, a quick response (QR) code (registered trademark) corresponding to the user of another mobile terminal 20 registered as a user installing the key application in the center server 30) from the other mobile terminal 20 via the communication processing unit 2301. The key sharing request unit 2309 may transmit a temporary key sharing request for designating another mobile terminal 20 specified based on the identification information as a distribution target, to the center server 30.

The mobile terminal 20Aa may acquire the identification information using another method. For example, the mobile terminal 20Aa may acquire identification information corresponding to the user of the other mobile terminal 20 in an aspect in which the identification information displayed on the display 24 of the other mobile terminal 20 is recognized using a mounted camera function. For example, the mobile terminal 20Aa may acquire the identification information transmitted from the user of the other mobile terminal 20 to a mail address or an SNS account of the owner user.

For example, according to a predetermined manipulation by the owner user, the key sharing request unit 2309 transmits a candidate terminal information request for requesting a candidate terminal information on a candidate terminal that is a candidate for the other mobile terminal 20 present around a current position of the mobile terminal 20Aa to the center server 30 via the communication processing unit 2302. When the candidate terminal information is received from the center server 30 by the communication processing unit 2302, the key sharing request unit 2309 causes the display 24 to display the candidate terminal information. When the candidate terminal information is displayed on the display 24, information for specifying a candidate terminal in which a specific manipulation or operation is performed among candidate terminals may be included in the candidate terminal information replied from the center server 30. Accordingly, the owner user of the vehicle 10A can specify another mobile terminal 20 from among the candidate terminals displayed on the display 24 of the mobile terminal 20Aa by the user of the other mobile terminal 20 as a key sharing target performing a specific manipulation or operation with respect to the mobile terminal 20. The key sharing request unit 2309 may transmit a temporary key sharing request for designating the other mobile terminal 20 specified from among the candidate terminals as a distribution target to the center server 30, according to a predetermined manipulation by the owner user.

The key sharing request unit 2309 may activate the key application according to a predetermined manipulation by the owner user to transmit link information according to a uniform resource locator (URL) scheme for allowing the other mobile terminal 20 to acquire the authentication key from the center server 30 (hereinafter, simply referred to as "link information") to a mail address or an account of an SNS of the user of the other mobile terminal 20 via the communication processing unit 2302. In this case, the key sharing request unit 2309 transmits a temporary key sharing request for designating the acquired authentication key to the center server 30 via the communication processing unit 2302 according to a predetermined manipulation by the owner user, and acquires the link information replied from the center server 30 according to the temporary key sharing request. Accordingly, the key sharing request unit 2309 can cause the authentication key to be distributed from the center server 30 to the other mobile terminal 20.

The temporary key sharing may be executed from the mobile terminal 20Ab of the sub-user to which the authentication key has already been distributed. That is, a function regarding the temporary key sharing in the key sharing request unit 2309 may be included in a function of the key application that is installed in the processing device 23 of the mobile terminal 20Ab of the sub-user. Accordingly, it is not needed to lend and borrow the mobile terminal 20Ab of the sub-user who has acquired the authentication key even when a plurality of persons including no owner user gets on the vehicle 10A together, and convenience for the sub-user of the vehicle 10A can be further improved. Hereinafter, description will be given on the premise that the temporary key sharing can be performed from the mobile terminal 20Ab of the sub-user.

The processing device 32 of the center server 30 includes the communication processing unit 3201, the condition determination unit 3202, the authentication key issuance unit 3203, and the storage unit 3200, as described above. The processing device 32 of the center server 30 includes, for example, a position information management unit 3204, a schedule management unit 3205, a registration management unit 3206, and a key sharing management unit 3207 as functional units realized by executing one or more programs stored in an auxiliary storage device or the like of a server computer on a CPU.

When the authentication key acquisition request has been received from the mobile terminals 20Aa, 20Ab by the communication processing unit 3201, the condition determination unit 3202 performs authentication based on the regular user ID and the password included in the authentication key acquisition request. For example, the condition determination unit 3202 collates the regular user ID and password registered in the storage unit 3200 with the regular user ID and password included in the authentication key acquisition request, and determines that the authentication is successful, that is, the authentication key acquisition request is a regular authentication key acquisition request when both match.

The condition determination unit 3202 determines whether or not the authentication key arrangement request transmitted from the key sharing management unit 3207 to be described below is a regular authentication key arrangement request. For example, when the authentication is successful based on authentication information (for example, the ID and the password) included in the authentication key arrangement request from the key sharing management unit 3207, the condition determination unit 3202 may determine that the authentication key arrangement request is a regular authentication key arrangement request.

When the condition determination unit 3202 determines that the authentication key acquisition request or the authentication key arrangement request is a regular authentication key acquisition request or a regular authentication key arrangement request, the authentication key issuance unit 3203 issues the authentication key and distributes the authentication key to the mobile terminal 20 via the communication processing unit 3201.

The position information management unit 3204 manages the position information of the vehicles 10 (10A, 10B). Specifically, the position information management unit 3204 transmits a position information request to the vehicle 10 via the communication processing unit 3201. In response to the position information request, the DCM 14 of the vehicle 10 replies the center server 30 with the position information of the vehicle 10 input from the GPS module 13, and the position information management unit 3204 can acquire the position information of the vehicle 10.

The position information management unit 3204 acquires the position information from the vehicle 10A via the communication processing unit 3201 and monitors the position information of the vehicle 10A in real time to figure out a movement situation of the vehicle 10A. Accordingly, for example, the position information management unit 3204 can notify the owner user of the position information of the vehicle 10A lent to the sub-user via the communication processing unit 3201. For example, the position information management unit 3204 can notify the mobile terminal 20Ab of the sub-user of information such as whether or not the vehicle 10A scheduled to be lent to the sub-user is directed to a designated position (for example, a house) or a reference for returning, via the communication processing unit 3201.

The schedule management unit 3205 manages the use situation of the vehicle 10A regarding various services. For example, the schedule management unit 3205 periodically acquires a use schedule of the vehicle 10 by the key sharing service and, specifically, information on a date and time on which the authentication key distributed by the key sharing service is available, from the key sharing management unit 3207. The schedule management unit 3205 acquires the use schedule of the vehicle 10A by each of the vehicle cabin delivery service and the C2C car sharing service from the delivery management server 50 and the C2C car sharing management server 70 via the communication processing unit 3201. The schedule management unit 3205 generates information on the use schedule of the vehicle 10A (vehicle use schedule information) over a plurality of services based on the acquired use schedule of the vehicle 10A regarding the various services, and updates the vehicle use schedule information stored in the storage unit 3200.

The registration management unit 3206 performs registration of the regular user (the sub-user) who uses various services according to the user registration request received from the mobile terminal 20Aa of the owner user by the communication processing unit 3201. For example, the registration management unit 3206 collates the owner user ID and password included in the user registration request from the mobile terminal 20Aa with the owner user ID and password stored in the storage unit 3200, and determines that the user registration request is a regular user registration request when both match. That is, the registration management unit 3206 determines that the authentication is successful. The registration management unit 3206 registers the sub-user ID included in the regular user registration request in a user service registration information database (DB) in the storage unit 3200 as the regular user who can use various services.

The registration management unit 3206 performs registration of use of various services by the regular user of the vehicle 10A according to the service use registration request received from the mobile terminal 20Aa of the owner user by the communication processing unit 3201. That is, according to the service use registration request, the registration management unit 3206 performs registration of an authentication key arrangement authority of the key sharing management unit 3207 or the service management server 40 corresponding to various services to allow the user of the vehicle 10A to use various services. For example, the registration management unit 3206 performs the same authentication process as described above based on the owner user ID and the password included in the service use registration request from the mobile terminal 20Aa to determine whether the service use registration request is a regular service use registration request. When the service use registration request is a regular service use registration request, the registration management unit 3206 determines whether or not the regular user ID included in the service use registration request has already been registered in the user service registration information DB. When the regular user ID included in the service use registration request has already been registered in the user service registration information DB, the registration management unit 3206 registers the service of a target specified by the service use registration request in the user service registration information database (DB) in the storage unit 3200 as a service available to the regular user corresponding to the regular user ID.

Specifically, the registration management unit 3206 constructs a user service registration information DB in an aspect in which service-specific information for specifying a target service, vehicle-specific information for specifying the vehicle 10A, a regular user ID for specifying a regular user who uses the service, and service link information in which the vehicle-specific information corresponding to the vehicle 10A and the regular user ID are associated with the target service is linked to the owner user ID.

The service-specific information is, for example, a service ID that is defined for each service. Specifically, when a plurality of companies provides, for example, the C2C car sharing service, a unique service ID is defined for each of the companies. For example, when the same company provides a plurality of C2C car sharing services, a unique service ID is defined for each of the services provided by the same company. When a vehicle cabin delivery service is provided by a combination of a plurality of delivery companies and a plurality of EC companies, a unique service ID may be defined for each combination of the delivery company and the EC company, and the target service may be specified by a combination of the unique service ID defined for each of the delivery companies and a unique service ID defined for each of the EC companies.

The vehicle-specific information may be any information as long as the information is able to specify the vehicle 10A that is a target of locking, unlocking, or activation using the authentication key. For example, the vehicle-specific information may be identification information such as a vehicle ID or a vehicle identification number (VIN), which is defined for each vehicle 10A. For example, the vehicle-specific information may be identification information such as a key unit ID, which is defined for each in-vehicle device related to locking, unlocking, or activation of the doors based on the authentication key mounted on the vehicle 10A such as the key unit 12. Hereinafter, description will be given on the premise that the vehicle-specific information is the key unit ID.

The service link information is information needed for the key sharing management unit 3207, the delivery management server 50, the EC server 60, and the C2C car sharing management server 70 managing various services to transmit the authentication key arrangement request to thereby cause the authentication key issuance unit 3203 to issue the authentication key of the vehicle 10A that is a target and distribute the authentication key to the mobile terminal 20 that is a target. That is, the authentication key issuance unit 3203 can specify the vehicle 10A that is a target of locking, unlocking, or activation using the authentication key and issue an appropriate authentication key by receiving the authentication key arrangement request including the service link information from the key sharing management unit 3207, the delivery management server 50, the EC server 60, and the C2C car sharing management server 70.

The service link information may be any information as long as the target service is associated with the vehicle 10A and the user who uses the service in the center server 30. For example, the service link information may be a login ID of the regular user at a website for users of various services corresponding to the key sharing management unit 3207, the delivery management server 50, the EC server 60, and the C2C car sharing management server 70 (hereinafter referred to as a "service login ID" for convenience). In this case, the service use registration request unit 2307 of the mobile terminal 20Aa transmits the service use registration request including the service login ID of the regular user that is a registration target corresponding to the various services to the center server 30 via the communication processing unit 2302. When the regular user that is a registration target corresponding to various services does not acquire the service login ID, the processing device 23 of the mobile terminal 20Aa may activate a predetermined browser and acquire the service login ID of a website of various services. Accordingly, when the user (the regular user of the vehicle 10A) logs in to the website at the time of requesting a service that is a target, the delivery management server 50 or the C2C car sharing management server 70 can figure out the service login ID corresponding to the service link information and easily arrange the authentication key regarding the service provision. Hereinafter, description will be given on the premise that the service link information on the vehicle cabin delivery service and the C2C car sharing service is the service login ID.

In a case of regular users who regularly use a plurality of vehicles 10A, the center server 30 can specify the regular user solely by using the service login ID, but cannot specify the vehicle 10A. Therefore, information for indirectly specifying the vehicle 10A (for example, information obtained by encrypting the vehicle-specific information using a predetermined scheme) in addition to the service login ID may be included in the service link information.

When the registration of use of various services has been completed, registration management unit 3206 notifies the mobile terminals 20Aa, 20Ab corresponding to the regular users that are registration targets that the registration of use of various services has been completed, via the communication processing unit 3201. When the registration of use of various services has been completed, the registration management unit 3206 transmits a service use registration completion notification including the service link information to the key sharing management unit 3207 or the service management server 40 that performs an operation and management of a service that is a registration target.

A notification that the registration of use of various services for the mobile terminals 20Aa, 20Ab has been completed may be transmitted from the service management server 40 that has received the service use registration completion notification.

When the service use situation request has been received from the mobile terminal 20Aa by the communication processing unit 3201, the registration management unit 3206 generates the service use situation information based on, for example, the vehicle use schedule information managed by the user service registration information DB of the storage unit 3200 or the schedule management unit 3205, and distributes the service use situation information to the mobile terminal 20Aa via the communication processing unit 3201.

The key sharing management unit 3207 performs an operation and management of the key sharing service.

For example, according to the key sharing request received from the mobile terminal 20Aa of the owner user by the communication processing unit 3201, the key sharing management unit 3207 performs the arrangement of the authentication key to the mobile terminals 20Aa, 20Ab corresponding to the regular user ID designated by the key sharing request. Specifically, the key sharing management unit 3207 collates the owner user ID and the password included in the key sharing request with the owner user ID and the password stored in the storage unit 3200, and determines that the key sharing request is a regular key sharing request when both match. The key sharing management unit 3207 inquires of the schedule management unit 3205 and determines whether or not there is mismatch, that is, overlapping of the use date and time regarding the use of the services and the vehicle 10A of the regular users between the use period information included in the key sharing request and the latest vehicle use schedule information. When there is no overlapping of the use time, the key sharing management unit 3207 transmits, to the authentication key issuance unit 3203, the authentication key arrangement request including information on the regular users corresponding to the mobile terminals 20Aa, 20Ab that are distribution targets of the authentication key specified by the information included in the key sharing request, and the vehicle 10A that is a target of locking, unlocking, or activation using the authentication key, and authority information such as a period of time in which the authentication key is available to the respective mobile terminals 20Aa, 20Ab, the number of times the authentication key is available to the respective mobile terminals 20Aa, 20Ab, unlockable doors, and whether or not the vehicle can be activated. Accordingly, the authentication key issuance unit 3203 can specify the regular user IDs corresponding to the mobile terminals 20Aa, 20Ab that are distribution targets of the authentication key, and the vehicle 10A that is a target of locking, unlocking, or activation using the authentication key, and issue an appropriate authentication key.

For example, the key sharing management unit 3207 confirms, for example, attribute information (for example, an age or presence or absence of a driving license) of the users of the mobile terminals 20Aa, 20Ab that are distribution targets of the authentication key that is designated by the key sharing request, which is stored in the storage unit 3200. When the users of the mobile terminal 20Aa, 20Ab (regular users of the vehicle 10A) that are distribution targets of the authentication key are users determined to be unable to drive the vehicle 10A, the key sharing management unit 3207 allows an authentication key to which an authority to be unable to activate the vehicle 10A has been imparted to be issued to the mobile terminal 20 of the user. The user who cannot drive the vehicle 10A is, for example, a user who has not reached an age at which the user can acquire a driver's license or a user who does not acquire the driver's license. Specifically, the key sharing management unit 3207 transmits an authentication key arrangement request in which an indication that the activation of the vehicle 10A is prohibited is included in authority information corresponding to the mobile terminals 20Aa, 20Ab corresponding to the users determined to be unable to drive the vehicle 10A, to the authentication key issuance unit 3203. Accordingly, since the authentication key issuance unit 3203 can distribute the authentication key to which the authority to prohibit the activation of the vehicle 10A has been imparted, to the mobile terminals 20Aa, 20Ab of the users who are unable to drive the vehicle 10A, it is possible to improve safety of the vehicle 10A in the key sharing service.

For example, the key sharing management unit 3207 distributes the authentication key of the vehicle 10A to the other mobile terminal 20 designated by the temporary key sharing request received from the mobile terminal 20Aa of the owner user by the communication processing unit 3201 based on the temporary key sharing request. Specifically, the key sharing management unit 3207 specifies the ID of the installing user corresponding to the other mobile terminal 20 that is a distribution target (hereinafter simply referred to as an "installing user ID") based on the installing user information DB of the key application stored in the storage unit 3200. The key sharing management unit 3207 transmits an authentication key arrangement request including the specified installing user ID and information (for example, an issued ID of the authentication key included in the temporary key sharing request) corresponding to the authentication key designated by the temporary key sharing request to the authentication key issuance unit 3203. Accordingly, the authentication key issuance unit 3203 can specify another mobile terminal 20 that is a distribution target based on the installing user ID, the issued ID of the authentication key, and the like, and distribute the authentication key to the other mobile terminal 20 via the communication processing unit 3201.

A function of the key sharing management unit 3207 may be transferred to a server (a key sharing management server) outside the center server 30, which may be included in the service management server 40, similar to other services for using the vehicle 10A.

The mobile terminal 20Ab carried by the sub-user includes the communication processing unit 2301, the communication processing unit 2302, the authentication key acquisition unit 2303, the authentication request unit 2304, the locking and unlocking request unit 2305, and the storage unit 2300, as described above.

In the embodiment, description will be given on the premise that the function of the authentication key acquisition unit 2303 of the mobile terminal 20Ab is available to the sub-user by the key application being activated and the user authentication based on bidirectional communication with the center server 30 being successful. Description will be given on the premise that the user authentication is performed by the center server 30 based on the sub-user ID and the password. Description will be given on the premise that functions of the authentication request unit 2304 and the locking and unlocking request unit 2305 of the mobile terminal 20Ab are available to the sub-user by the key application being activated.

The authentication key acquisition unit 2303 acquires the authentication key distributed from the center server 30 according to the key sharing request transmitted from the mobile terminal 20Aa to the center server 30 via the communication processing unit 2302, as described above. Accordingly, the mobile terminal 20Ab can lock and unlock the doors of the vehicle 10A or activate the vehicle 10A based on the functions of the communication processing unit 2301, the authentication request unit 2304, and the locking and unlocking request unit 2305. That is, the sub-user carrying the mobile terminal 20Ab can directly use the vehicle 10A through the key sharing service. For example, the sub-user can lock and unlock the vehicle 10A using the mobile terminal 20Ab without performing key exchange with the owner user and drive the vehicle 10A. Similarly, the owner user can lend the vehicle 10A to the sub-user without exchanging the key with the sub-user. Accordingly, it is possible to improve convenience in lending and borrowing of the vehicle 10A between the owner user of the vehicle 10A and the sub-user through the key sharing service in the authentication key management system 1.

The authentication key acquisition unit 2303 acquires the authentication key that is distributed from the center server 30 according to the temporary key sharing request transmitted from the mobile terminal 20Aa to the center server 30 via the communication processing unit 2302, as described above. The same applies to a case where the authentication key is distributed to another mobile terminal 20 other than the mobile terminal 20Ab of the sub-user according to the temporary key sharing request. Accordingly, the other mobile terminal 20 including the mobile terminal 20Ab can lock and unlock the doors of the vehicle 10A or activate the vehicle 10A based on the functions of the communication processing unit 2301, the authentication request unit 2304, and the locking and unlocking request unit 2305. That is, for example, when a plurality of persons including other regular users gets on the vehicle 10A together and goes out and even when the sub-user carrying the mobile terminal 20Ab does not acquire the authentication key in advance, the sub-user does not have to borrow the mobile terminals 20Aa, 20Ab to which the authentication key has already been distributed, and can directly use the vehicle 10A using the mobile terminal 20Ab, such as locking and unlocking the vehicle 10A or driving the vehicle 10A. Similarly, even when the owner user has not caused the mobile terminal 20Ab of the sub-user to acquire the authentication key, it is not needed for the owner user to lend the mobile terminal 20Aa of the owner user to the sub-user. Accordingly, it is possible to improve convenience of the user in a case where a plurality of persons including the regular user of the vehicle 10A gets on the vehicle 10A together and uses the vehicle 10A through the temporary key sharing in the authentication key management system 1.

Details of Configuration Regarding Vehicle Cabin Delivery Service

A configuration regarding the vehicle cabin delivery service in the authentication key management system 1 will be described with reference to FIG. 4.

Figure 4:
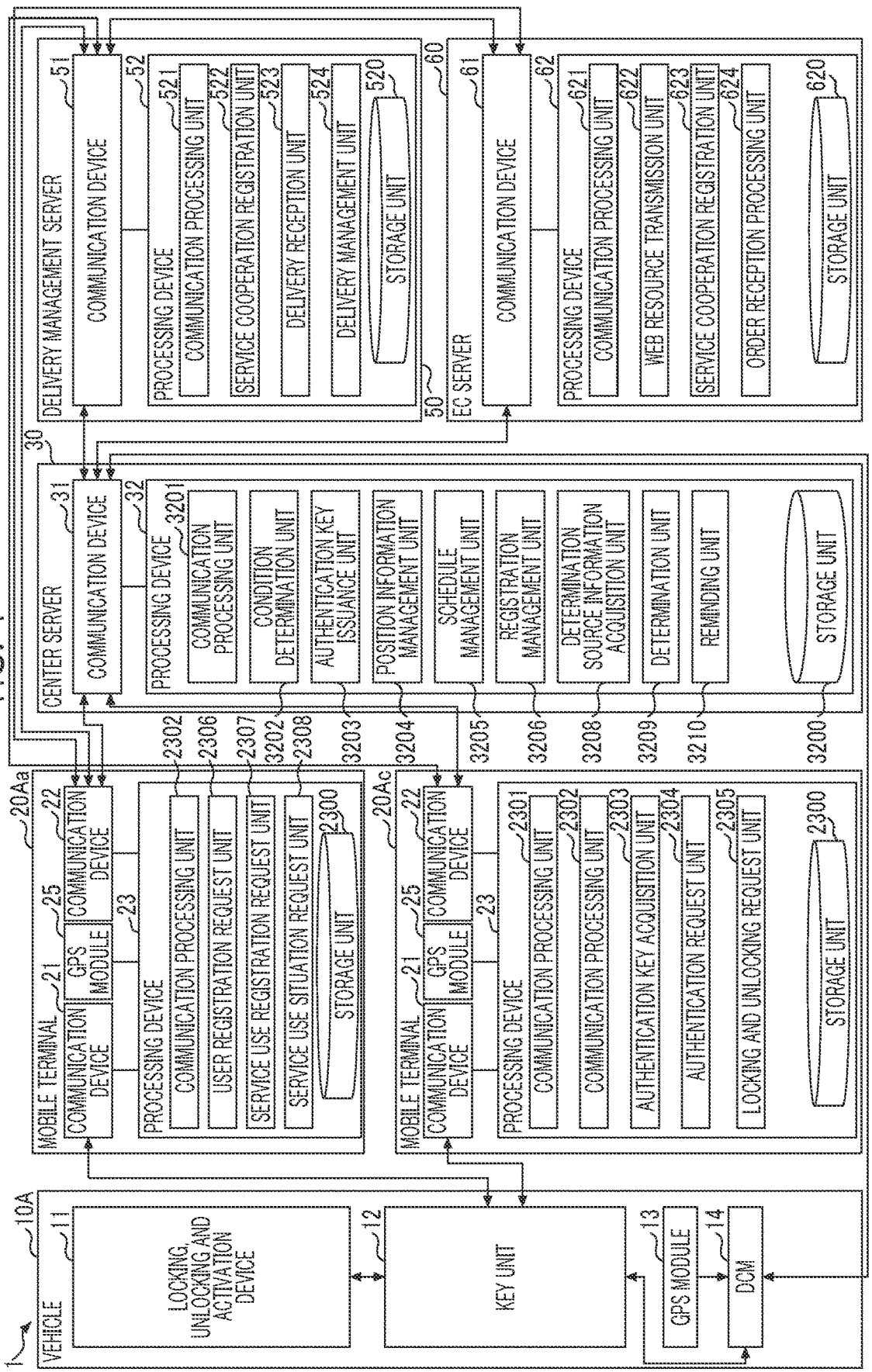
FIG. 4 is a diagram mainly illustrating an example of a configuration regarding a vehicle cabin delivery service in the authentication key management system.

FIG. 4 is a diagram mainly illustrating an example of a configuration regarding a vehicle cabin delivery service in the authentication key management system 1. Hereinafter, the configuration regarding the vehicle cabin delivery service in the authentication key management system 1 will be mainly described with reference to FIG. 4, and duplicate description on the configuration overlapping the above-described configuration regarding the key sharing service will be omitted as much as possible.

The processing device 23 of the mobile terminal 20Aa carried by the owner user of the vehicle 10A includes the communication processing unit 2302, the user registration request unit 2306, the service use registration request unit 2307, and the service use situation request unit 2308, as described above.

The user registration request unit 2306 requests the center server 30 to register the regular user (a sub-user) of the vehicle 10A who uses various services including the vehicle cabin delivery service according to a predetermined manipulation by the owner user, as described above.

The service use registration request unit 2307 requests the center server 30 to perform the registration of use of various services including the vehicle cabin delivery service for each registered regular user (the owner user or the sub-user) according to a predetermined manipulation by the owner user, as described above.

For example, the service use registration request unit 2307 transmits, as the service link information, a service use registration request for using the vehicle cabin delivery service including a service login ID of a website for a user who uses the service of the delivery management server 50 (hereinafter simply referred to as a "delivery site") and a service login ID of the EC site, which corresponds to the regular user of the vehicle 10A that is a registration target, to the center server 30.

The service use situation request unit 2308 requests the center server 30 to provide information on a use situation of various services (service use situation information) including the vehicle cabin delivery service of the regular user of the vehicle 10A for which the use registration has been performed, in a form corresponding to the owner user ID according to a predetermined manipulation by the owner user, as described above.

The delivery management server 50 that performs an operation of the vehicle cabin delivery service includes a communication device 51 and a processing device 52.

The communication device 51 is any device that performs bidirectional communication with each of the mobile terminal 20, the center server 30, and the EC server 60 over a predetermined communication network.

The processing device 52 includes, for example, a communication processing unit 521, a service cooperation registration unit 522, a delivery reception unit 523, and a delivery management unit 524 as functional units that are realized by executing one or more programs stored in the ROM or the auxiliary storage device on the CPU. The processing device 52 includes a storage unit 520 that is realized as a storage area of an auxiliary storage device or the like of the server computer.

The communication processing unit 521 controls the communication device 51 to perform transmission and reception of various signals such as control signals or information signals to and from each of the mobile terminal 20, the center server 30, and the EC server 60.

The service cooperation registration unit 522 performs information registration for cooperation between the center server 30 regarding the use of the vehicle cabin delivery service of the regular user of the vehicle 10A and the delivery management server 50 according to the service use registration completion notification received from the center server 30 by the communication processing unit 521.

For example, the service cooperation registration unit 522 adds a flag indicating a use target of the vehicle cabin delivery service to the service login ID (a part of service link information) included in the service use registration completion notification in the user management DB that manages the user of the delivery site constructed in the storage unit 520. In addition, the service cooperation registration unit 522 performs registration in an aspect in which information for specifying the vehicle 10A included in the service link information and a service login ID of a website (that is, the EC site) corresponding to the EC server 60 included in the service use registration completion notification is linked to the service login ID included in the service use registration completion notification in the user management DB of the storage unit 520. Accordingly, when the user corresponding to the service login ID regularly uses the vehicles 10A, the delivery management server 50 transmits an authentication key arrangement request to the center server 30 for the vehicle 10A designated by the user. When an order reception including a service login ID is received from the EC server 60 by the communication processing unit 521, the delivery management server 50 can specify the corresponding service login ID of the delivery site. The delivery management server 50 transmits the authentication key arrangement request including service link information such as the specified service login ID or information for specifying the vehicle 10A corresponding to the vehicle 10A designated by the user to the center server 30 such that it is possible to cause the authentication key to be distributed from the center server 30 to the mobile terminal 20Ac of the deliverer, as described below.

The delivery reception unit 523 receives information (delivery request information) on the package delivery request including the service login ID of the EC site corresponding to an orderer of the product at the EC site from the EC server 60 via the communication processing unit 521. The delivery request information received from the EC server 60 includes basic information such as name, address, telephone number of the orderer corresponding to the delivery destination. The delivery request information also includes, for example, information (delivery destination information) on the designated delivery destination, information (scheduled delivery date-and-time information) on the scheduled delivery date and time designated by the orderer (client) (designated delivery date and time) or the scheduled delivery date and time scheduled by the delivery company when the delivery date and time are not specifically designated, etc. In this case, when the trunk of the vehicle 10A is designated as a delivery destination, the delivery destination information may include information (parking location information) on a designated location to which the deliverer is directed, i.e. a location in which the vehicle 10A is parked upon delivery of the package (product). The delivery request information may include, for example, information (product type information) on a type of the package (product) (for example, a pre-defined class) as the delivery target. In this case, the target product may be classified, for example, into categories "food" and "non-food." The category "food" may be further classified into a plurality of subcategories according to its expiration date or best-by date. Furthermore, the target product may be classified into categories "gift (present)" such as an anniversary gift, a year-end present, a midsummer gift or the like, and "non-gift." In this case, when the product falls within the category of the "gift", the product type information may include information on a date, a period or a season corresponding to the gift (for example, a date in a case of a birthday gift or an anniversary gift, or a corresponding period or season in a case of a limited-time gift such as a year-end present).

The delivery management unit 524 performs an operation and management of each process from reception to delivery regarding the delivery request received by the delivery reception unit 523.

For example, when the delivery management unit 524 receives a notification that package has reached a business office that has jurisdiction over a parking position of the vehicle 10A designated by the delivery destination information of the delivery request from the business office via the communication processing unit 521, the delivery management unit 524 decides a date and time of departure for delivery of the package, a deliverer in charge, and the like according to a designated delivery date and time (delivery date and time period).

The delivery management unit 524 inquires of the center server 30 about the position information of the vehicle 10A via the communication processing unit 521 before departure for the delivery of the package that is a target (for example, 10 minutes before the departure). The delivery management unit 524 acquires current position information of the vehicle 10A from the center server 30 via the communication processing unit 521 and determines whether or not the delivery is available from whether or not the current position matches the designated parking position of the vehicle 10A, a relationship between the current position and a jurisdiction area, or the like.

The determination as to whether or not the delivery is available may be made by the center server 30.

When the delivery management unit 524 determines that the delivery can be performed with respect to a package that is a target, the delivery management unit 524 transmits a notification that the package can be delivered to the trunk of the vehicle 10A (delivery available notification) to the mobile terminal 20Ac of the deliverer via the communication processing unit 521.

When an authentication key acquisition request is received from the mobile terminal 20Ac that has received the delivery available notification by the communication processing unit 521, the delivery management unit 524 determines whether or not the authentication key acquisition request is a regular authentication key acquisition request. Specifically, the delivery management unit 524 may perform the determination by collating information on a package that is a delivery target (hereinafter referred to as "delivery package information" for convenience) such as a deliverer, a destination (for example, a name of a recipient or a corporate name), a type of the package, a delivery time period, and a delivery place that can be included in the authentication key acquisition request, with various types of information on the package registered in the storage unit 520. When the delivery management unit 524 determines that the authentication key acquisition request is a regular authentication key acquisition request, the delivery management unit 524 transmits an authentication key arrangement request to the center server 30 via the communication processing unit 521. In this case, information for specifying the mobile terminal 20Ac of the deliverer may be included in the authentication key arrangement request. The information for specifying the deliverer may be, for example, an authentication ID for obtaining user authentication at the center server 30 in order for the deliverer to use the function of the key application corresponding to the authentication key acquisition unit 2303 of the mobile terminal 20Ac or the like (hereinafter referred to as a "deliverer ID" for convenience). Accordingly, the mobile terminal 20Ac of the deliverer can acquire the authentication key from the center server 30. Information for specifying the target package is included in the authentication key arrangement request.

Subsequently, the delivery management unit 524 receives an inquiry about the current position of the vehicle 10A from the mobile terminal 20Ac of the deliverer who has left for the delivery from the business office via the communication processing unit 521, the delivery management unit 524 inquires of the center server 30 about the current position information of the vehicle 10A. The delivery management unit 524 acquires the current position information of the vehicle 10A from the center server 30 via the communication processing unit 521 and transmits (transfers) the current position information of the vehicle 10A to the mobile terminal 20Ac of the deliverer. Accordingly, the deliverer who has gone out can compare the current position information of the vehicle 10A with the information on the parking position of the vehicle 10A designated by the delivery destination information and determine whether to deliver or return the package to the business office.

Finally, when the delivery management unit 524 receives a delivery completion notification received from the mobile terminal 20Ac of the deliverer who has completed the delivery of the package via the communication processing unit 521, the delivery management unit 524 transmits the delivery completion notification to the center server 30 via the communication processing unit 521 and basically ends an operation and management regarding the vehicle cabin delivery service regarding the package. When the operation and management regarding the vehicle cabin delivery service regarding the package ends, the delivery management unit 524 may notify the regular user of the vehicle 10A that is a client (a purchaser of a product at the EC site) through an electronic mail, a predetermined SNS, or a predetermined application program cooperating with the delivery site installed in the mobile terminals 20Aa, 20Ab that the delivery has been completed.

The DCM 14 of the vehicle 10A may determine that the delivery by the deliverer has been completed when the door (the trunk lid or the like) for access to the trunk of the vehicle 10A is locked after the door is unlocked by the unlocking request and the locking request transmitted from the mobile terminal 20Ac carried by the deliverer who has completed the delivery of the package, and notify the center server 30 that the delivery by the deliverer has been completed, as described above. Accordingly, the center server 30 can transmit a delivery completion notification to the delivery management server 50 when the notification is received. That is, the center server 30 may transmit a delivery completion notification to the delivery management server 50 in response to a message for notifying that the deliver has been completed, which is received by the deliverer from the vehicle 10A.

The EC server 60 includes a communication device 61 and a processing device 62.

The communication device 61 is any device that performs bidirectional communication with each of the mobile terminal 20, the center server 30, and the delivery management server 50 over a predetermined communication network.

The processing device 62 includes, for example, a communication processing unit 621, a web resource transmission unit 622, a service cooperation registration unit 623, and an order reception processing unit 624 as functional units that are realized by executing one or more programs stored in the ROM or the auxiliary storage device on the CPU. The processing device 62 includes a storage unit 620 that is realized as a storage area of an auxiliary storage device or the like of the server computer.

The communication processing unit 621 controls the communication device 61 to perform transmission and reception of various signals such as control signals or information signals to and from each of the mobile terminal 20, the center server 30, and the delivery management server 50.

The web resource transmission unit 622 transmits resources corresponding to the webpage to be displayed on a browser of any terminal of the user browsing the EC site including the mobile terminals 20Aa, 20Ab based on various types of information as resources of the EC site stored in the storage unit 620 to the browser of the terminal using a predetermined scheme. The webpage to be displayed on the EC site includes, a top page of the EC site, a webpage respectively corresponding to each product handled at the EC site (hereinafter simply referred to as an "individual product page"), a webpage for displaying a list of products (typically placed in a virtual cart on the EC site) selected by the user as may-be-purchased items (hereinafter simply referred to as a "cart page"), a webpage into which the user input various information upon ordering each product (hereinafter simply referred to as an "order input page"), etc. For example, the web resource transmission unit 622 transmits a Hyper Text Markup Language (HTML) document corresponding to a webpage, and information under the HTML document such as an image and a moving image displayed on webpages in parallel.

When a predetermined application program (hereinafter simply referred to as an "EC application"), in conjunction with (cooperating with) the EC site and installed in the user terminal, is activated, the web resource transmission unit 622 transmits resources to be displayed on a predetermined window or screen (hereinafter collectively referred to as a "window") of the EC application which is displayed on a display of the user terminal (for example, the display 24 of the mobile terminal 20), to the user terminal in a predetermined format. The window that may be displayed on the EC application includes a top window corresponding to the top page of the EC site described above, the individual product page, the cart page, the order input page or the like, an individual product window, a cart window, an order input window, etc.

The service cooperation registration unit 623 performs information registration for cooperation between the center server 30 regarding the use of the vehicle cabin delivery service of the regular user of the vehicle 10A and the EC server 60 according to the service use registration completion notification received from the center server 30 by the communication processing unit 621. For example, the service cooperation registration unit 623 adds a flag indicating a use target of the vehicle cabin delivery service to the service login ID included in the service use registration completion notification in the user management DB that manages the user of the EC site constructed in the storage unit 620. In addition, the service cooperation registration unit 623 performs registration in an aspect in which a service login ID of a website (that is, the delivery site) corresponding to the delivery management server 50 included in the service use registration completion notification is linked to the service login ID included in the service use registration completion notification in the user management DB. Accordingly, for example, when an inquiry about an ordered product including the service login ID of the delivery site is received from the delivery management server 50 by the communication processing unit 621, the EC server 60 can specify the service login ID of the corresponding EC site.

The order reception processing unit 624 receives a product order from the user based on various input information related to the product order, which is input from the EC site accessed via a browser of the user terminal (for example, the mobile terminals 20Aa, 20Ab) or the EC application activated in the user terminal. In this case, when the trunk of the vehicle 10A is selected as a delivery destination on the order input page of the EC site, the order reception processing unit 624 inquires the center server 30 about the vehicle use schedule information via the communication processing unit 621. Accordingly, the order reception processing unit 624 can acquire the latest vehicle use schedule information via the communication processing unit 621. Therefore, for example, when a designated date and time of delivery has already overlapped another schedule, the order reception processing unit 624 can take countermeasures such as requesting to change a delivery date and time. Meanwhile, the order reception processing unit 624 decides the trunk of the vehicle 10A as the delivery destination when vehicle use schedule information of the vehicle 10A corresponding to the designated (selected) delivery destination matches the designated delivery date and time.

The order reception processing unit 624 transmits information (delivery request information) on the received delivery request of the product to the delivery management server 50 and the center server 30 via the communication processing unit 621 after receiving the product order from the user. Accordingly, the delivery company can receive the delivery request of the product ordered via the EC site or the EC application. The center server 30 can figure out the scheduled delivery date and time based on the scheduled delivery date-and-time information included in the delivery request information.

In this case, the information (product type information) on a type of the product, which may be included in the delivery request information, may be input by the user via the order input page, or may be automatically generated in accordance with a classification code defined for each product in advance, as described above. Specifically, the web resource transmission unit 622 may display on the order input page, for example, a Q&A column for asking whether or not the ordered product is a gift, and a remark column for requesting input of a date corresponding to an anniversary in a case where the ordered product is a gift.

As described above, the vehicle cabin delivery service in which a package other than the ordered product at the EC site is a target can also be assumed. In this case, the delivery management server 50 may similarly acquire the latest vehicle use schedule information from the center server 30. Accordingly, the delivery management server 50 can take countermeasures such as requesting to change a delivery date and time when a date and time of delivery of the package to the trunk of the vehicle 10A designated by the regular user of the vehicle 10A has already overlapped another schedule.

The processing device 32 of the center server 30 that assists in an operation of the vehicle cabin delivery service includes the communication processing unit 3201, the condition determination unit 3202, the authentication key issuance unit 3203, the position information management unit 3204, the schedule management unit 3205, the registration management unit 3206, and the storage unit 3200, as described above. The processing device 32 of the center server 30 (an example of the information processing device) includes a determination source information acquisition unit 3208, a determination unit 3209, and a reminding unit 3210 as functional units realized by executing one or more programs stored in the ROM of the server computer or the auxiliary storage device on the CPU.

When the condition determination unit 3202 receives the authentication key arrangement request from the delivery management server 50 via the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on service login information (the service login ID of the delivery site or the like) included in the authentication key arrangement request or predetermined authentication information (for example, the ID and the password) corresponding to the delivery management server 50.

When the condition determination unit 3202 determines that the authentication key arrangement request is a regular authentication key arrangement request, the authentication key issuance unit 3203 issues the authentication key corresponding to the regular authentication key arrangement request and distributes the authentication key to the mobile terminal 20Ac of the deliverer.

Specifically, the authentication key issuance unit 3203 specifies the vehicle 10A corresponding to the authentication key arrangement request based on the user service registration information DB of the storage unit 3200. The authentication key issuance unit 3203 issues the authentication key in which a time is limited (for example, the vehicle is available solely in units of several minutes to tens of minutes from the distribution), the number of times of use is limited (for example, the number of times of use is solely 1), and an authority is limited so that solely locking and unlocking of the trunk lid can be allowed. Accordingly, it is possible to suppress unauthorized use of the vehicle 10A by the deliverer and to improve security. The authentication key issuance unit 3203 distributes the authentication key to the mobile terminal 20Ac of the deliverer specified by the authentication key arrangement request via the communication processing unit 3201.

For example, any method such as a known mathematical method or a method based on bidirectional communication between the center server 30 and the vehicle 10 may be adopted as a method of limiting a period of time in which the authentication key is available or the number of times the authentication key is used.

In response to the inquiry about the current position of the vehicle 10 A from the delivery management server 50 received by the communication processing unit 3201, the position information management unit 3204, for example, acquires the position information from the vehicle 10A via the communication processing unit 3201 and provides (transmits) the position information to the delivery management server 50 via the communication processing unit 3201.

For example, the schedule management unit 3205 replies the EC server 60 with the latest vehicle use schedule information stored in the storage unit 3200 via the communication processing unit 3201 according to the inquiry from the EC server 60 received by the communication processing unit 3201.

The schedule management unit 3205 updates, for example, the vehicle use schedule information stored in the storage unit 3200 via the communication processing unit 3201 by adding use of the vehicle 10A related to the vehicle cabin delivery service, based on the scheduled delivery date-and-time information included in the delivery request information received from the EC server 60.

The registration management unit 3206 performs registration of the regular user (the sub-user) who uses various services including the vehicle cabin delivery service according to the user registration request received from the mobile terminal 20Aa of the owner user by the communication processing unit 3201, as described above. The registration management unit 3206 performs registration of use of the vehicle cabin delivery service by the regular user of the vehicle 10A according to the service use registration request received from the mobile terminal 20Aa of the owner user by the communication processing unit 3201, as described above. When the registration of use of various services including the vehicle cabin delivery service has been completed, the registration management unit 3206 notifies the mobile terminals 20Aa, 20Ab corresponding to the regular users that are registration targets that the registration of use of various services including the vehicle cabin delivery service has been completed via the communication processing unit 3201, as described above. When the registration of use of the vehicle cabin delivery service has been completed, the registration management unit 3206 transmits a service use registration completion notification including the service link information to the delivery management server 50 and the EC server 60 that perform an operation and management of a service that is a registration target via the communication processing unit 3201.

The determination source information acquisition unit 3208 (an example of the information acquisition unit) acquires various information used in determination performed by the determination unit 3209 to be described below. Specifically, the determination source information acquisition unit 3208 acquires information on whether or not the delivered package is received from the trunk of the vehicle 10A designated as the delivery destination.

For example, the determination source information acquisition unit 3208 acquires from the vehicle 10A information on whether the client (the regular user of the vehicle 10A) locks the door accessing the trunk of the vehicle 10A designated as the delivery destination of the package. Specifically, the determination source information acquisition unit 3208 acquires from the vehicle 10A via the communication processing unit 3201 a notification (client locking notification) indicating that the client has locked the door accessing the trunk of the vehicle 10A after the package was delivered. Accordingly, the center server 30 can figure out whether or not the trunk of the vehicle 10A corresponding to the delivery destination has been locked after the deliver was completed. Therefore, the center server 30 can determine whether or not the package has been received, e.g. by determining (estimating) that the door accessing the trunk was opened and closed to pick up the package before the door has been locked. In this case, the determination source information acquisition unit 3208 transmits to the regular user of the vehicle 10A as the client a reply request for the client locking notification including information on the distributed authentication key via the communication processing unit 3201 when the package delivery to the vehicle 10A was completed (specifically, when receiving the delivery completion notification from delivery company, i.e. from the deliverer, the delivery management server 50, or the like). Accordingly, the DCM 14 of the vehicle 10A can return the client locking notification to the center server 30 when the door accessing the trunk has been locked by the key unit 12 based on the authentication request including the authentication key transmitted from the mobile terminals 20Aa, 20Ab of the client.

The determination source information acquisition unit 3208 may further acquire information on opening of the door accessing the trunk of the vehicle 10A from the vehicle 10A after the package delivery was completed. Specifically, the determination source information acquisition unit 3208 may acquire from the vehicle 10A via the communication processing unit 3201 a notification (trunk opening notification) indicating that the door accessing the trunk of the vehicle 10A has been opened after the package was delivered. Accordingly, the center server 30 can further confirm whether or not the door of the trunk has been opened after the delivery was completed. Therefore, the center server 30 can determine (estimate) whether or not the package has been received more reliably, for example, by determining (estimating) that the package delivered to the trunk of the vehicle 10A has been picked up if the door accessing the trunk of the vehicle 10A was opened immediately before the door accessing the trunk has been locked by the client. In this case, the determination source information acquisition unit 3208 transmits to the regular user of the vehicle 10A as the client reply requests for the client locking notification including information on the distributed authentication key and for the trunk opening notification via the communication processing unit 3201 when the package delivery to the vehicle 10A was completed. Accordingly, the DCM 14 of the vehicle 10A can return the trunk opening notification to the center server 30 when the door accessing the trunk has been opened based on an ON/OFF state of a door switch of the door accessing the trunk.

For example, the determination source information acquisition unit 3208 acquires from the client a notification (receipt notification) indicating the delivered package has been received. Accordingly, the center server 30 can determine whether or not the package delivered to the trunk of the vehicle 10A has been received based on whether the receipt notification is acquired or not. Specifically, the determination source information acquisition unit 3208 may acquire the receipt notification transmitted to the center server 30 via a predetermined application (for example, a key application, etc.) activated in the user terminal of the client (for example, the mobile terminals 20Aa, 20Ab, etc.) in accordance with a predetermined manipulation on the user terminal. The determination source information acquisition unit 3208 may acquire the receipt notification transmitted to a mail address or a predetermined SNS account of the client, corresponding to the center server 30, from the mail address or the SNS account via the electronic mail or the SNS.

For example, the determination source information acquisition unit 3208 acquires the position information of the mobile terminals 20Aa, 20Ab carried by the client. Accordingly, since the center server 30 can figure out the movement situation of the client from the position information of the mobile terminals 20Aa, 20Ab, the center server can determine (estimate) whether or not the client has received the package by confirming whether or not the client has approached the vehicle 10A after the delivery was completed. In this case, the determination source information acquisition unit 3208 transmits a request for position information acquisition to the mobile terminals 20Aa, 20Ab of the client via the communication processing unit 3201 when the package delivery to the vehicle 10A was completed. Accordingly, the corresponding mobile terminals 20Aa, 20Ab can return the position information measured by the GPS module 25 to the center server 30.

The position information is uploaded from the mobile terminals 20Aa, 20Ab to the center server 30 under permission of the user of the mobile terminals 20Aa, 20Ab (for example, when the position information is permitted to be transmitted with a setting relating to the privacy of the mobile terminals 20Aa, 20Ab).

The determination unit 3209 determines whether or not the package is received from the trunk of the vehicle 10A based on the information acquired by the determination source information acquisition unit 3208 (that is, information on whether or not the delivered package is received from the trunk of the vehicle 10A).

For example, the determination unit 3209 determines that the package has been received from the trunk of the vehicle 10A when the information indicating that the door accessing the trunk of the vehicle 10A has been locked by the client, i.e. the client locking notification, is acquired by the determination source information acquisition unit 3208 after the package was delivered to the trunk of the vehicle 10A. Meanwhile, the determination unit 3209 determines that the package is not received from the trunk of the vehicle 10A when the client locking notification is not acquired after the package was delivered to the trunk of the vehicle 10A.

The determination unit 3209 may determine that the package has been received from the trunk of the vehicle 10A when the information indicating that the door accessing the trunk has been opened and then locked by the client, i.e. a series of the trunk opening notification and the client locking notification, is acquired by the determination source information acquisition unit 3208 after the package was delivered to the trunk of the vehicle 10A. Meanwhile, the determination unit 3209 may determine that the package is not received from the trunk of the vehicle 10A after the package was delivered to the trunk of the vehicle 10A when a series of the trunk opening notification and the client locking notification is not acquired by the determination source information acquisition unit 3208 after the door accessing the trunk has been opened by the client.

For example, the determination unit 3209 determines that the package has been received from the trunk of the vehicle 10A when the receipt notification corresponding to the package is acquired by the determination source information acquisition unit 3208 after the package was delivered to the trunk of the vehicle 10A. Meanwhile, the determination unit 3209 determines that the package is not received from the trunk of the vehicle 10A when the receipt notification corresponding to the package is not acquired by the determination source information acquisition unit 3208 after the package was delivered to the trunk of the vehicle 10A.

For example, the determination unit 3209 determines that the package has been received from the trunk of the vehicle 10A when the position information of the mobile terminals 20Aa, 20Ab of the client, acquired by the determination source information acquisition unit 3208, indicates that the client has moved to within the predetermined range (for example, within 10 meters) in the vicinity of the vehicle 10A after the package was delivered to the trunk of the vehicle 10A. Meanwhile, the determination unit 3209 determines that the package is not received from the trunk of the vehicle 10A when the position information of the mobile terminals 20Aa, 20Ab of the client, acquired by the determination source information acquisition unit 3208, indicates that the client has not moved to within the predetermined range in the vicinity of the vehicle 10A after the package was delivered to the trunk of the vehicle 10A.

The reminding unit 3210 reminds the client to receive the package when the package is not received from the trunk of the vehicle 10A even after a predetermined time has elapsed since the package was delivered to the trunk of the vehicle 10A designated as the delivery destination of the package. Specifically, the reminding unit 3210 reminds the client to receive the package when the determination unit 3209 determines that the package is not received from the trunk of the vehicle 10A even after a predetermined time has elapsed since the package was delivered to the trunk of the vehicle 10A. Accordingly, the center server 30 is capable of allowing the client to receive the package from the trunk of the vehicle 10A relatively earlier after the delivery was completed by appropriately setting the predetermined time, thereby suppressing the package being left in the trunk of the vehicle 10A. In this case, the predetermined time may be a fixed value or a variable value that varies based on certain conditions. A method for deciding the predetermined time will be described later (see FIGS. 7 to 10).

For example, the reminding unit 3210 may display a reminder on a display (for example, the display 24) of the user terminal of the client (for example, the mobile terminals 20Aa, 20Ab) by transmitting the reminder to the user terminal of the client so as to remind the client. More specifically, the reminding unit 3210 may display the reminder on the display of the user terminal of the client via a notification function or the like, provided by a predetermined application program (for example, a key application, etc.) installed in the user terminal.

For example, the reminding unit 3210 may transmit a reminder relating to receipt of the package from the trunk of the vehicle 10A, to a mail address or a predetermined SNS account of the client, which is registered (stored) in the storage unit 3200 in advance.

A part or all of the various functions of the center server 30, associated with the vehicle cabin delivery service, may be transferred to the delivery management server 50 (an example of the information processing device). For example, while the center server 30 may deal with the distribution of the authentication key to the mobile terminal 20Ac, the management of the position information of the vehicle 10A, the management of the use schedule of the vehicle 10A, and the registration of use of the vehicle cabin delivery service, the functions of the determination source information acquisition unit 3208, the determination unit 3209 and the reminding unit 3210 may be transferred to the delivery management server 50. Moreover, for example, the center server 30 may perform solely the distribution of the authentication key to the mobile terminal 20Ac of the deliverer, and the functions of the position information management unit 3204, the schedule management unit 3205 and the registration management unit 3206, associated with the vehicle cabin delivery service, may be further transferred to the delivery management server 50. Furthermore, for example, all of the various functions of the center server 30, associated with the vehicle cabin delivery service, may be transferred to the delivery management server 50. That is, delivery management server 50 may be configured to perform the distribution of the authentication key to the mobile terminal 20Ac of the deliverer (that is, the functions of the condition determination unit 3202 and the authentication key issuance unit 3203), the management of the position information of the vehicle 10A (that is, the function of the position information management unit 3204), the management of the use schedule of the vehicle 10 A in the vehicle cabin delivery service (that is, the function of the schedule management unit 3205), the registration of use of the vehicle cabin delivery service (that is, the function of the registration management unit 3206), the acquisition of the information on whether or not the package delivered to trunk of the vehicle 10A is received (that is, the function of the determination source information acquisition unit 3208), the determination whether or not the package delivered to trunk of the vehicle 10A is received (that is, the function of the determination unit 3209), and the reminding of the client to receive the package from the trunk of the vehicle 10A (that is, the function of the reminding unit 3210).

The processing device 23 of the mobile terminal 20Ac of a deliverer includes the communication processing unit 2301, the communication processing unit 2302, the authentication key acquisition unit 2303, the authentication request unit 2304, and the locking and unlocking request unit 2305, as described above.

In the embodiment, the description will be given on the premise that the functions of the authentication key acquisition unit 2303, the authentication request unit 2304, and the locking and unlocking request unit 2305 of the mobile terminal 20Ac are available to the deliverer by the key application being activated.

The authentication key acquisition unit 2303 transmits the authentication key acquisition request to the delivery management server 50 via the communication processing unit 2302 according to a predetermined manipulation by a deliverer. In this case, the authentication key acquisition request includes the above-described delivery package information stored in the storage unit 2300 in advance. Accordingly, the delivery management server 50 transmits an authentication key arrangement request to the center server 30 according to the authentication key acquisition request, the center server 30 distributes the authentication key to the mobile terminal 20Ac according to the authentication key arrangement request, and the mobile terminal 20Ac can acquire the authentication key. Therefore, the mobile terminal 20Ac can lock and unlock the trunk lid of the vehicle 10A based on the functions of the communication processing unit 2301, the authentication request unit 2304, and the locking and unlocking request unit 2305, such that the deliverer can deliver the requested package to the trunk of the vehicle 10A, lock the trunk of the vehicle 10A, and return home.

Details of Configuration Regarding C2C Car Sharing Service

A configuration regarding a C2C car sharing service in the authentication key management system 1 will be described with reference to FIG. 5.

Figure 5:
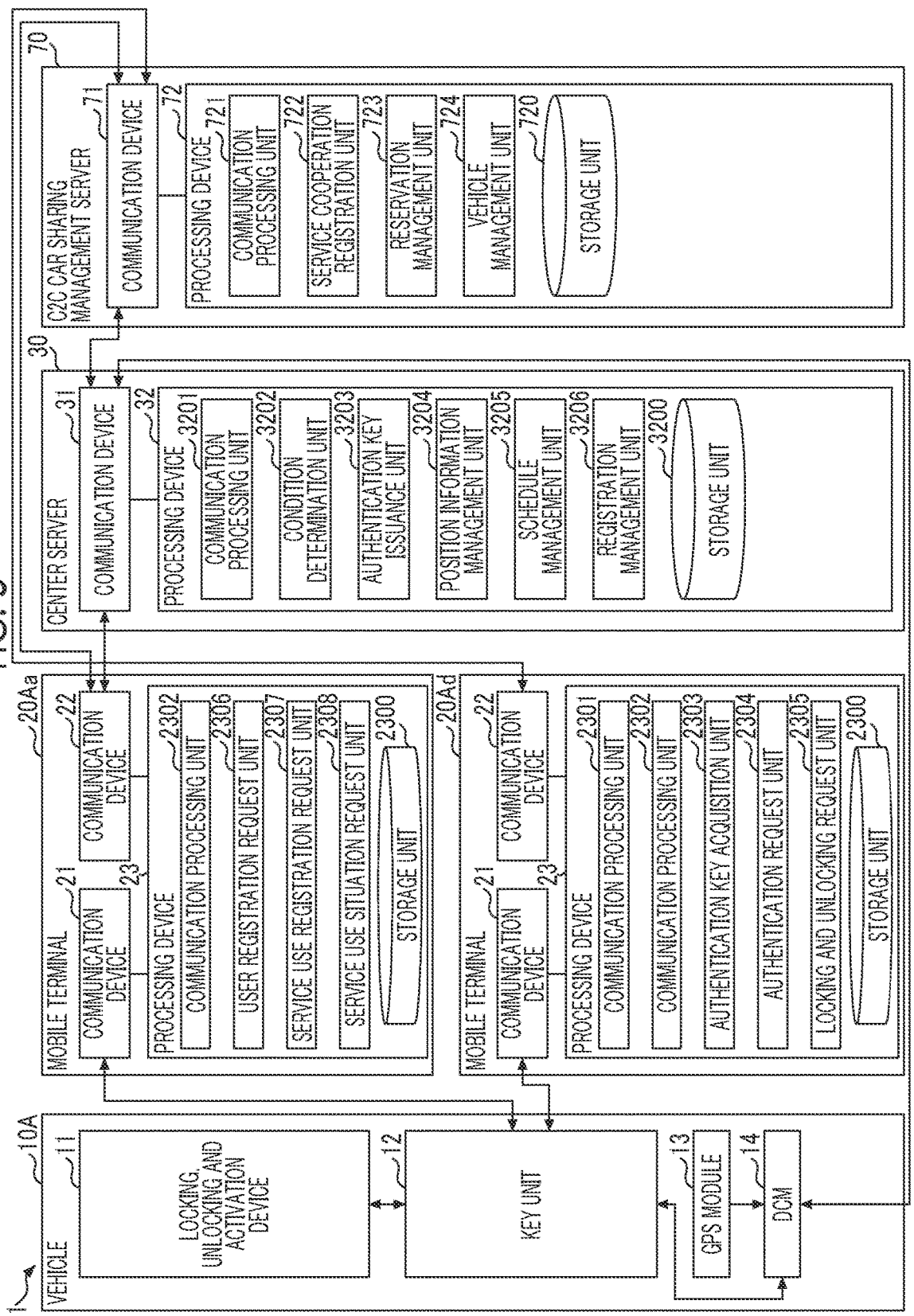
FIG. 5 is a diagram mainly illustrating an example of a configuration regarding a consumer to consumer (C2C) car sharing service in the authentication key management system.

FIG. 5 is a diagram mainly illustrating an example of the configuration regarding the C2C car sharing service in the authentication key management system 1. Hereinafter, the configuration regarding the C2C car sharing service in the authentication key management system 1 will be mainly described with respect to FIG. 5, and duplicate description on the configuration overlapping the above-described configuration regarding the key sharing service or the like will be omitted as much as possible.

The processing device 23 of the mobile terminal 20Aa carried by the owner user of the vehicle 10A includes the communication processing unit 2302, the user registration request unit 2306, the service use registration request unit 2307, and the service use situation request unit 2308, as described above.

The user registration request unit 2306 requests the center server 30 to register the regular user (the sub-user) of the vehicle 10A who uses various services including the C2C car sharing service according to a predetermined manipulation by the owner user, as described above.

The service use registration request unit 2307 requests the center server 30 to perform the registration of use of various services including the C2C car sharing service for each registered regular user (the owner user or the sub-user) according to a predetermined manipulation by the owner user, as described above.

For example, the service use registration request unit 2307 transmits, as the service link information, a service use registration request for using the C2C car sharing service including a service login ID of a website for a user who uses the C2C car sharing service corresponding to the C2C car sharing management server 70 (hereinafter simply referred to as a "C2C car sharing site"), which corresponds to the regular user of the vehicle 10A that is a registration target, to the center server 30.

The service use situation request unit 2308 requests the center server 30 to provide information on a use situation of various services (service use situation information) including the C2C car sharing service of the regular user of the vehicle 10A for which the use registration has been performed, in a form corresponding to the owner user ID according to a predetermined manipulation by the owner user, as described above.

The C2C car sharing management server 70 includes a communication device 71 and a processing device 72.

The communication device 71 is any device that performs bidirectional communication with each of the mobile terminal 20 and the center server 30 over a predetermined communication network.

The processing device 72 includes, for example, a communication processing unit 721, a service cooperation registration unit 722, a reservation management unit 723, and a vehicle management unit 724 as functional units that are realized by executing one or more programs stored in the ROM or the auxiliary storage device on the CPU. The processing device 72 includes a storage unit 720 that is realized as a storage area of an auxiliary storage device or the like of the server computer.

Description will be given on the premise that the information for specifying the vehicle 10A that is a lending target has already been stored (registered) in the storage unit 720 in an aspect in which the information is linked to the service login ID via the C2C car sharing site by the regular user (the owner user) of the vehicle 10A.

The communication processing unit 721 controls the communication device 71 to perform transmission and reception of various signals such as control signals or information signals to and from each of the mobile terminal 20 and the center server 30.

The service cooperation registration unit 722 performs information registration for cooperation between the center server 30 regarding the use of the C2C car sharing service of the regular user of the vehicle 10A and the C2C car sharing management server 70 according to the service use registration completion notification received from the center server 30 by the communication processing unit 721.

For example, the service cooperation registration unit 722 adds a flag indicating a lender of the vehicle 10A the C2C car sharing service to the service login ID included in the service use registration completion notification in the user management DB that manages the user of the C2C car sharing site constructed in the storage unit 720. The C2C car sharing management server 70 transmits the authentication key arrangement request including the service login ID corresponding to the regular user of the vehicle 10A, which is the lender, to the center server 30 such that it is possible to cause the authentication key to be distributed from the center server 30 to the mobile terminal 20Ad of the borrower, as described below.

The reservation management unit 723 manages reservation of use of the vehicle 10A that is performed through the C2C car sharing site or the like.

For example, the reservation management unit 723 receives registration of a date and time on which the vehicle 10A is rentable from the regular user of the vehicle 10A through the C2C car sharing site and stores (registers) the received date and time on which the vehicle 10A is rentable in the storage unit 720. In this case, the reservation management unit 723 inquires of the center server 30 about the vehicle use schedule information via the communication processing unit 721. Accordingly, the reservation management unit 723 can acquire the latest vehicle use schedule information via the communication processing unit 721. Therefore, the C2C car sharing management server 70, for example, can take countermeasures such as requesting to change the date and time on which the vehicle 10A is rentable, which is received from the regular user of the vehicle 10A, or registering a portion excluding an overlapping portion from the date and time on which the vehicle 10A is rentable as the date and time on which the vehicle 10A is rentable when the received date and time on which the vehicle 10A is rentable already overlaps another schedule or registering.

For example, the reservation management unit 723 receives the reservation of use of the vehicle 10A within a range of the date and time on which the vehicle 10A is rentable, which is stored in the storage unit 720. When the reservation management unit 723 receives the reservation of use of the vehicle 10A from a user who is a borrower through the C2C car sharing site, the reservation management unit 723 updates information on a lending schedule of the vehicle 10A (lending schedule information) stored in the storage unit 720.

For example, when the authentication key acquisition request is received from the mobile terminal 20Ad of the borrower of the vehicle 10A by the communication processing unit 721, the reservation management unit 723 determines whether or not the authentication key acquisition request is a regular authentication key acquisition request. Specifically, the reservation management unit 723 may perform the determination based on the service login ID and the password of the C2C car sharing site included in the authentication key acquisition request, or a relationship regarding the date and time of reservation of use (for example, within a range of the date and time of reservation of use or less than a predetermined time until a date and time of use start). When the authentication key acquisition request is a regular authentication key acquisition request, the reservation management unit 723 transmits an authentication key arrangement request to the center server 30 via the communication processing unit 721. In this case, information for specifying the mobile terminal 20Ad of the borrower of the vehicle 10A is included in the authentication key arrangement request. The information for specifying the borrower of the vehicle 10A may be, for example, an authentication ID (hereinafter referred to as a "borrower ID" for convenience) for obtaining user authentication in the center server 30 in order for the borrower of the vehicle 10A to use a function of the authentication key acquisition unit 2303 of the mobile terminal 20Ad. Accordingly, the mobile terminal 20Ad of the borrower of the vehicle 10A can acquire the authentication key from the center server 30.

The vehicle management unit 724 manages the vehicle 10A that is a lending target.

For example, the vehicle management unit 724 inquires of the center server 30 about a current position information of the vehicle 10A via the communication processing unit 721 before the date and time of reservation of use of the vehicle 10A (for example, a period from tens of minutes ago to immediately before). The vehicle management unit 724 acquires the current position information of the vehicle 10A replied from the center server 30 according to the inquiry via the communication processing unit 721. Accordingly, a determination can be made as to whether or not the vehicle 10A returns to a designated place before a date and time of lending (a date and time of reservation of use) of the vehicle 10A. Accordingly, when the vehicle 10A does not return to the designated place, the C2C car sharing management server 70 can take countermeasures such as warning the regular user who is a lender of the vehicle 10A so that the vehicle 10A returns to the designated place through an e-mail or a predetermined application cooperating with the C2C car sharing site, which is installed in the mobile terminals 20Aa, 20Ab.

The processing device 32 of the center server 30 includes the communication processing unit 3201, the condition determination unit 3202, the authentication key issuance unit 3203, the position information management unit 3204, the schedule management unit 3205, the registration management unit 3206, and the storage unit 3200, as described above.

When the authentication key arrangement request is received from the C2C car sharing management server 70 by the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on the service link information included in the authentication key arrangement request (for example, the service login ID of the C2C car sharing site) or predetermined authentication information (for example, the ID and the password) corresponding to the C2C car sharing management server 70.

When the condition determination unit 3202 determines that the authentication key arrangement request is a regular authentication key arrangement request, the authentication key issuance unit 3203 specifies the vehicle 10A corresponding to the authentication key arrangement request based on the user service registration information DB of the storage unit 3200. The authentication key issuance unit 3203 issues the authentication key in which a time is limited (for example, the vehicle is available solely at the date and time of reservation of use of the vehicle 10A included in the authentication key arrangement request and in a buffering period before and after such a date and time). The authentication key issuance unit 3203 distributes the authentication key to the mobile terminal 20Ad of the borrower of the vehicle 10A specified by the authentication key arrangement request via the communication processing unit 3201.

The C2C car sharing service may include, for example, a service (hereinafter referred to as a "vehicle trunk lending service" for convenience) in an aspect in which solely a trunk of the vehicle 10A is lent. In a case of a vehicle trunk lending service, the authentication key issuance unit 3203 may issue an authentication key with an authority limited so that locking and unlocking of the trunk lid are allowed. Accordingly, it is possible to limit a lending target of C2C car sharing to solely the trunk. Consequently, for example, a vehicle cabin delivery service in an aspect in which the trunk of the vehicle 10A to be lent at a travel destination is borrowed and a purchased product for use at a travel destination is delivered to the borrowed trunk can be realized.

The position information management unit 3204 transmits a position information request to the vehicle 10A via the communication processing unit 3201 according to the inquiry about the current position of the vehicle 10A received from the C2C car sharing management server 70 by the communication processing unit 3201. Accordingly, the position information management unit 3204 can acquire the current position information from the vehicle 10A via the communication processing unit 3201. The position information management unit 3204 replies the C2C car sharing management server 70 with the current position information acquired from the vehicle 10A via the communication processing unit 3201.

The schedule management unit 3205 transmits the latest vehicle use schedule information to the vehicle 10A via the communication processing unit 3201 according to the inquiry about the current position of the vehicle 10A received from the C2C car sharing management server 70 by the communication processing unit 3201.

The registration management unit 3206 performs registration of the regular user (the sub-user) who uses various services including the C2C car sharing service according to the user registration request received from the mobile terminal 20Aa of the owner user by the communication processing unit 3201, as described above. The registration management unit 3206 performs registration of use of the C2C car sharing service by the regular user of the vehicle 10A according to the service use registration request received from the mobile terminal 20Aa of the owner user by the communication processing unit 3201, as described above. When the registration of use of various services including the C2C car sharing service has been completed, the registration management unit 3206 notifies the mobile terminals 20Aa, 20Ab corresponding to the regular users that are registration targets that the registration of use of various services including the C2C car sharing service has been completed via the communication processing unit 3201, as described above. When the registration of use of the C2C car sharing service has been completed, the registration management unit 3206 transmits a service use registration completion notification including the service link information to the C2C car sharing management server 70 that performs an operation and management of a service that is a registration target via the communication processing unit 3201.

The processing device 23 of the mobile terminal 20Ad of the borrower of the vehicle 10A includes the communication processing unit 2301, the communication processing unit 2302, the authentication key acquisition unit 2303, the authentication request unit 2304, the locking and unlocking request unit 2305, and the storage unit 2300, as described above.

The authentication key acquisition unit 2303 transmits an authentication key acquisition request to the C2C car sharing management server 70 via the communication processing unit 2302 according to a predetermined manipulation by the borrower of the vehicle 10A. In this case, the service login ID of the C2C car sharing site corresponding to the borrower of the vehicle 10A is included in the authentication key acquisition request. Accordingly, the C2C car sharing management server 70 can transmit an authentication key arrangement request to the center server 30 according to the authentication key acquisition request, the center server 30 can distribute the authentication key to the mobile terminal 20Ad according to the authentication key arrangement request, and the mobile terminal 20Ad can acquire the authentication key. Therefore, the mobile terminal 20Ad can lock and unlock the door of the vehicle 10A based on the functions of the communication processing unit 2301, the authentication request unit 2304, and the locking and unlocking request unit 2305. That is, the borrower of the vehicle 10A carrying the mobile terminal 20Ad can directly use the vehicle 10A, such as locking and unlocking the vehicle 10A and driving the vehicle 10A using the mobile terminal 20Ad without performing exchange of a key with the regular user of the vehicle 10A through the C2C car sharing service. Similarly, the regular user of the vehicle 10A can lend the vehicle 10A to another person other than the regular user without exchanging the key. Therefore, it is possible to improve convenience in lending and borrowing of the vehicle 10A between the regular user of the vehicle 10A and another person other than the regular user through the C2C car sharing service in the authentication key management system 1.

Details of Configuration Regarding B2C Car Sharing Service

A B2C car sharing service in the authentication key management system 1 will be described with reference to FIG. 6.

Figure 6:
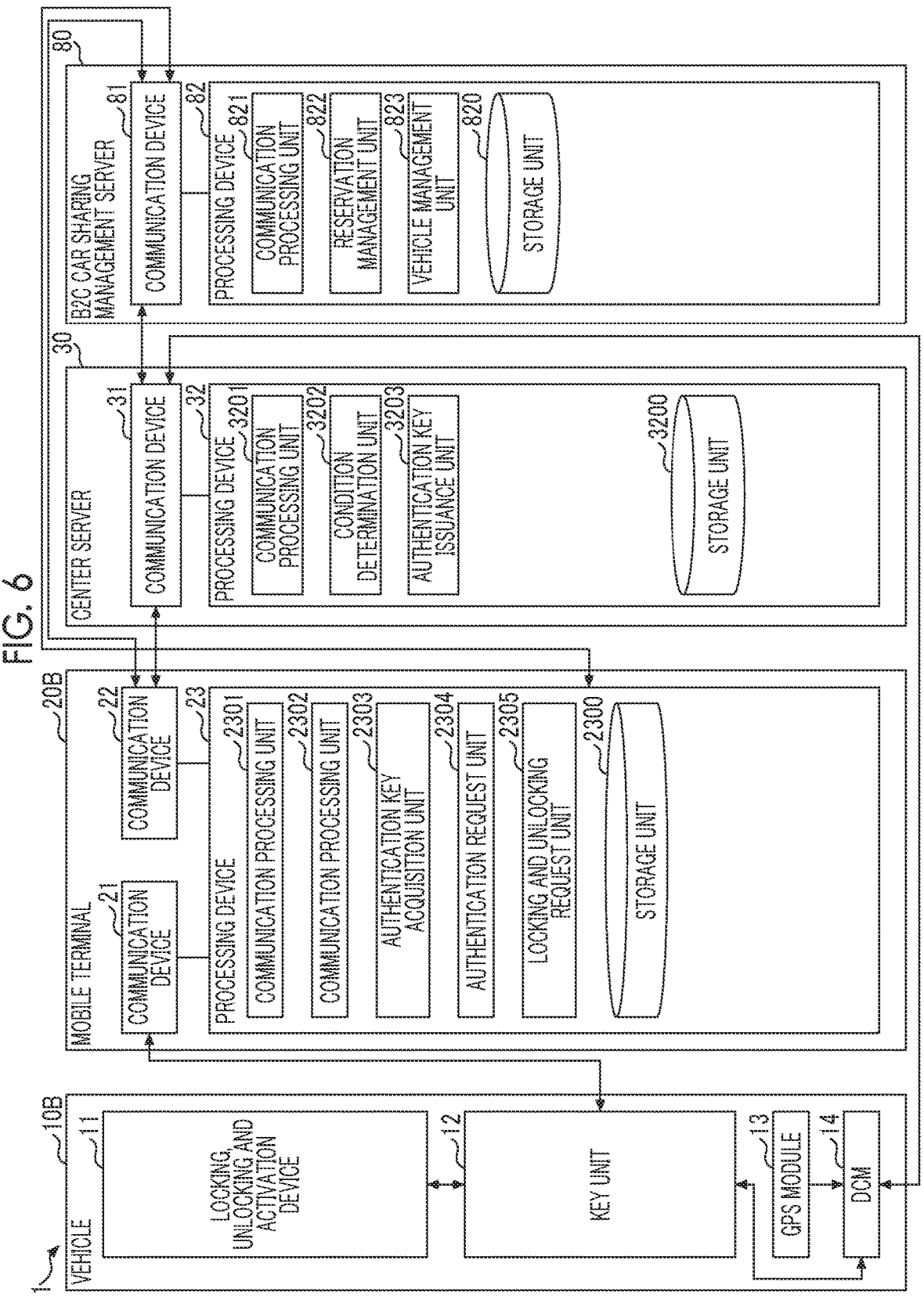
FIG. 6 is a diagram mainly illustrating an example of a configuration regarding a business to consumer (B2C) car sharing service in the authentication key management system.

FIG. 6 is a diagram mainly illustrating an example of the configuration regarding the B2C car sharing service in the authentication key management system 1. Hereinafter, the configuration regarding the B2C car sharing service in the authentication key management system 1 will be mainly described with respect to FIG. 6, and duplicate description on the configuration overlapping the above-described configuration regarding the key sharing service or the like will be omitted as much as possible.

The B2C car sharing management server 80 includes a communication device 81 and a processing device 82.

The communication device 81 is any device that performs bidirectional communication with each of the mobile terminal 20B and the center server 30 over a predetermined communication network.

The processing device 82 includes, for example, a communication processing unit 821, a reservation management unit 822, and a vehicle management unit 823 as functional units that are realized by executing one or more programs stored in the ROM or the auxiliary storage device on the CPU. The processing device 82 includes a storage unit 820 that is realized as a storage area of an auxiliary storage device or the like of the server computer.

The communication processing unit 821 controls the communication device 81 to perform transmission and reception of various signals such as control signals or information signals to and from each of the mobile terminal 20B and the center server 30.

The reservation management unit 822 manages the reservation of use of the vehicle 10B that is performed through the B2C car sharing site or the like.

For example, the reservation management unit 822 receives reservation of use of the vehicle 10B from a user (hereinafter simply referred to as a "borrower user") who wants to borrow the vehicle 10B through a website that is operated by a company of the B2C car sharing management server 80 or the like (hereinafter referred to as a "B2C car sharing site" for convenience). The reservation management unit 822 stores information on the received reservation of use of the vehicle 10B (use reservation information) in the storage unit 820. In this case, for example, information for specifying the vehicle 10A that is a target, information on a date and time of reservation of use (a start date and time of use and an end date and time of use), and a service login ID of the borrower user in the B2C car sharing site may be included in the use reservation information.

For example, the reservation management unit 822 updates the information on the use schedule of the vehicle 10B (the vehicle use schedule information) stored in the storage unit 820 each time the reservation management unit 822 receives the reservation of use of the vehicle 10B.

Accordingly, the B2C car sharing management server 80 can display the use schedule of the vehicle 10B on the B2C car sharing site to present a date and time when the reservation of use can be made, to the borrower user.

For example, when the authentication key request is received from the mobile terminal 20B by the communication processing unit 821, the reservation management unit 822 determines whether or not the authentication key request is a regular authentication key request. Specifically, the reservation management unit 822 may perform the determination based on the service login ID and the password of the B2C car sharing site corresponding to the borrower user included in the authentication key request, or a relationship regarding the date and time of reservation of use (for example, within a range of the date and time of reservation of use or less than a predetermined time until a date and time of use start). When the authentication key request is a regular authentication key acquisition request, the reservation management unit 822 transmits an authentication key arrangement request to the center server 30 via the communication processing unit 821. In this case, information for specifying the mobile terminal 20B of the borrower user borrowing the vehicle 10B is included in the authentication key arrangement request. The information for specifying the borrower user borrowing the vehicle 10B may be, for example, an authentication ID (hereinafter referred to as a "borrower user ID" for convenience) for obtaining user authentication in the center server 30 in order for the borrower user borrowing the vehicle 10B to use a function of a key application corresponding to the authentication key acquisition unit 2303 of the mobile terminal 20B or the like. Accordingly, the mobile terminal 20B of the borrower user borrowing the vehicle 10B can acquire the authentication key from the center server 30.

The vehicle management unit 823 manages the vehicle 10B that is a lending target.

For example, the vehicle management unit 823 inquires of the center server 30 about the vehicle 10B parked in the vicinity (for example, within hundreds of meters) of a place designated in the reservation of use via the communication processing unit 821 before the date and time of reservation of use of the vehicle 10B of a borrower user (for example, before tens of minutes). The vehicle management unit 823 acquires the position information of the vehicle 10B parked in the vicinity of the designated place replied from the center server 30 according to the inquiry via the communication processing unit 821. Accordingly, the vehicle management unit 823 can specify one or a plurality of vehicles 10B parked around the designated place and determine, for example, the vehicle 10B to be lent before the start date and time of use of the vehicle 10B of the borrower.

For example, the vehicle management unit 823 inquires of the center server 30 about the position information of the vehicle 10B in the designated area via the communication processing unit 821 according to a search request of the vehicle 10B in a designated area by the borrower user at the B2C car sharing site. The vehicle management unit 823 acquires the position information of the vehicle 10B in the designated area replied from the center server 30 according to the inquiry via the communication processing unit 821. Accordingly, the vehicle management unit 823, for example, can present the position information of the vehicle 10B that is a target to the borrower user who wants to borrow the vehicle 10B in the designated area immediately at the B2C car sharing site.

The processing device 32 of the center server 30 includes the communication processing unit 3201, the condition determination unit 3202, the authentication key issuance unit 3203, and the storage unit 3200, as described above.

When the authentication key arrangement request received from the B2C car sharing management server 80 is received by the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on whether or not the borrower user ID included in the authentication key arrangement request is the authentication ID already registered in the storage unit 3200, or on predetermined authentication information (for example, an ID Password) corresponding to the B2C car sharing management server 80.

When the condition determination unit 3202 determines that the authentication key arrangement request is the regular authentication key arrangement request, the authentication key issuance unit 3203 issues the authentication key in which a time is limited (for example, the vehicle is available solely at the date and time of reservation of use of the vehicle 10B included in the authentication key arrangement request and in a buffering period before and after such a date and time). The authentication key issuance unit 3203 distributes the authentication key to the mobile terminal 20B of the borrower user borrowing the vehicle 10B specified by the authentication key arrangement request via the communication processing unit 3201.

The processing device 23 of the mobile terminal 20B of the borrower user borrowing the vehicle 10B includes the communication processing unit 2301, the communication processing unit 2302, the authentication key acquisition unit 2303, the authentication request unit 2304, the locking and unlocking request unit 2305, and the storage unit 2300, as described above.

The authentication key acquisition unit 2303 transmits an authentication key acquisition request to the B2C car sharing management server 80 via the communication processing unit 2302 according to a predetermined manipulation by the borrower user of the vehicle 10B. In this case, the service login ID of the B2C car sharing site corresponding to the borrower user borrowing the vehicle 10B is included in the authentication key acquisition request. Accordingly, the B2C car sharing management server 80 can transmit an authentication key arrangement request to the center server 30 according to the authentication key acquisition request, the center server 30 can distribute the authentication key to the mobile terminal 20B according to the authentication key arrangement request, and the mobile terminal 20B can acquire the authentication key. Therefore, the mobile terminal 20B can lock and unlock the door of the vehicle 10B based on the functions of the communication processing unit 2301, the authentication request unit 2304, and the locking and unlocking request unit 2305. That is, the borrower user borrowing the vehicle 10B carrying the mobile terminal 20B can directly use the vehicle 10B, such as locking and unlocking the vehicle 10B and driving the vehicle 10B using the mobile terminal 20B without performing exchange of a key with the company of the vehicle 10B through the B2C car sharing service. Therefore, it is possible to improve convenience for the borrower user borrowing the vehicle 10B through the B2C car sharing service in the authentication key management system 1.

Characteristic Operation of Center Server

Next, a process flow of a characteristic operation by the center server 30, that is, a process of reminding the client to receive the package from the trunk of the vehicle 10A (package receipt reminding process) will be described with reference to FIGS. 7 to 10.

Figure 7:
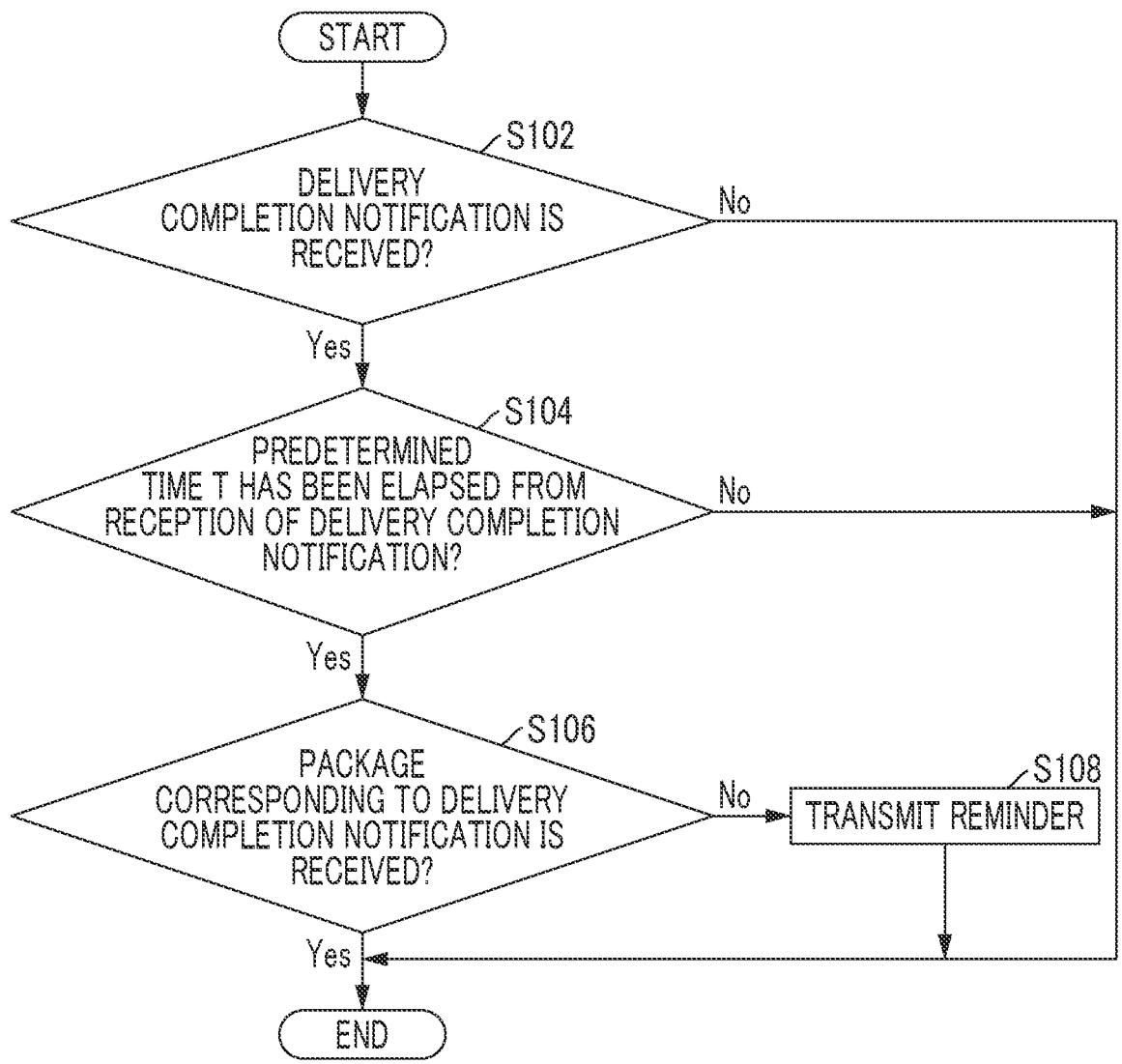
FIG. 7 is a flowchart schematically showing a first example of a reminding process of the center server.

FIG. 7 is a flowchart schematically showing a first example of the package receipt reminding process of the center server 30. A process according to this flowchart is repeatedly executed at predetermined process intervals. Hereinafter, the same applies to processes according to flowcharts of FIGS. 8 to 10.

In step S102, the reminding unit 3210 determines whether or not a delivery completion notification has been received from the delivery management server 50 or the like via the communication processing unit 3201. The reminding unit 3210 proceeds to step S104 when the delivery completion notification has been received from the delivery management server 50 or the like via the communication processing unit 3201, and otherwise the reminding unit 3210 terminates this process.

In step S104, the reminding unit 3210 determines whether or not a predetermined time T has been elapsed from reception of the delivery completion notification. In the example, the predetermined time T is a fixed value, which is appropriately defined in advance in order to transmit a reminder to prompt receipt of a package at a relatively earlier timing so as not to give an unpleasant feeling to the user, and is registered (stored) in the storage unit 3200. The reminding unit 3210 proceeds to step S106 when the predetermined time T has been elapsed from reception of the delivery completion notification.

In step S106, the determination unit 3209 determines whether or not a package corresponding to the delivery completion notification has been received from the vehicle 10A, as described above. The determination unit 3209 proceeds to step S108 when the package is not received from the vehicle 10A, and terminates this process when the package has been received.

In step S108, the reminding unit 3210 transmits a reminder to a predetermined user terminal of the client (for example, the mobile terminals 20Aa, 20Ab) in a format of push notifications via the communication processing unit 3201, and terminates this process. Moreover, the reminding unit 3210 may transmit the reminder to a mail address or a predetermined SNS account of the client via the communication processing unit 3201, as described above.

As described above, in this example, the center server 30 reminds the client of the package to receive the package from the trunk of the vehicle 10A when the predetermined time has been elapsed from reception of the delivery completion notification and the delivered package is not received. Accordingly, the center server 30 is capable of allowing the client to receive the delivered package from the trunk of the vehicle 10A relatively earlier by appropriately setting the predetermined time.

Figure 8:
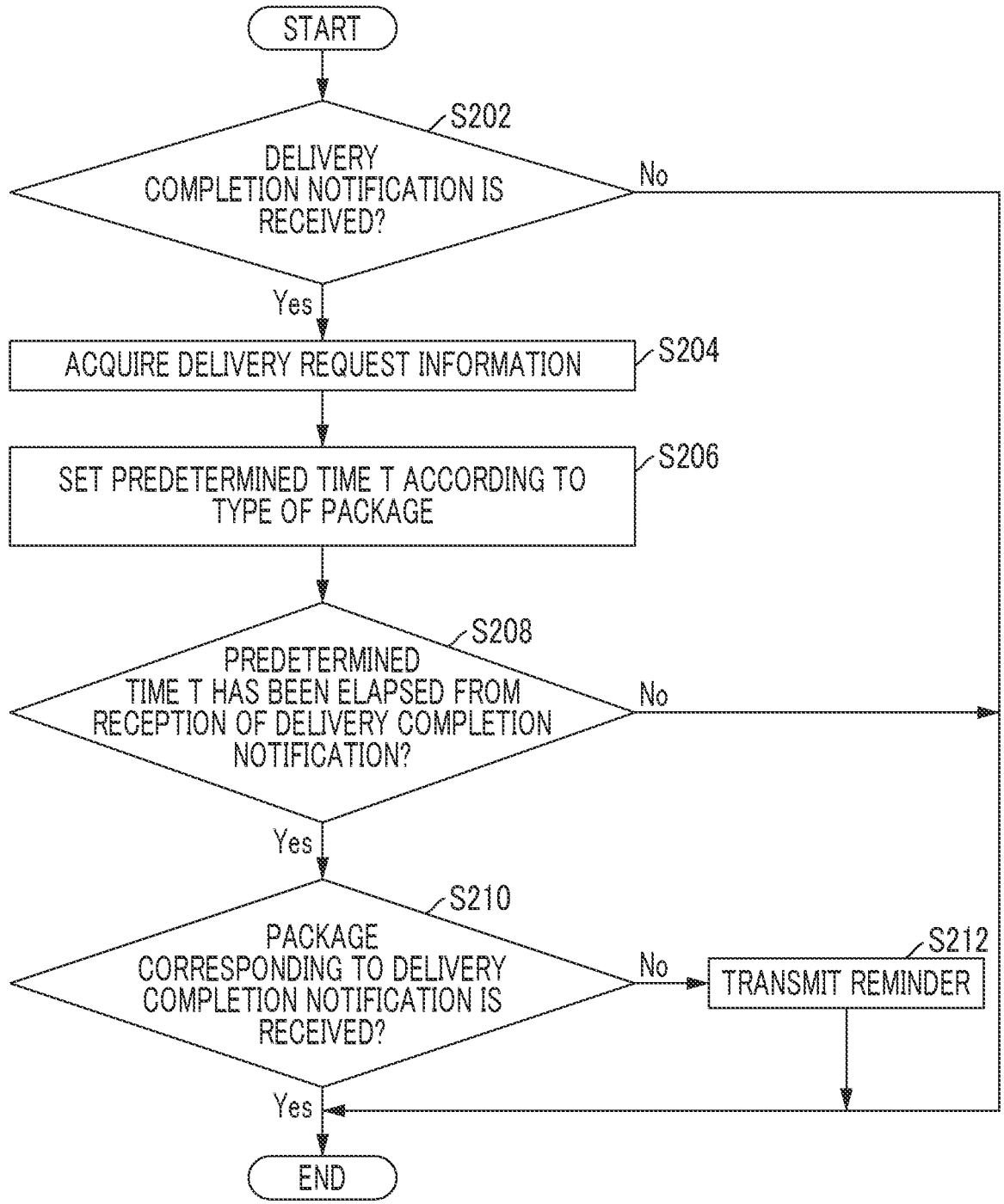
FIG. 8 is a flowchart schematically showing a second example of a reminding process of the center server.

FIG. 8 is a flowchart schematically showing a second example of the package receipt reminding process of the center server 30.

Since a process of step S202 is the same as the process of step S102 in FIG. 7, description thereof will be omitted.

In step S202, the reminding unit 3210 proceed to step S204 when the delivery completion notification has been received by the communication processing unit 3201.

In step S204, the reminding unit 3210 acquires delivery request information of a package corresponding to the delivery completion notification, which is stored in the storage unit 3200.

In step S206, the reminding unit 3210 specifies a type (class) of the package (product) based on product type information included in the acquired delivery request information, and sets (determines) a predetermined time T in accordance with the specified type of the package.

For example, the reminding unit 3210 alters the predetermined time T depending on whether the type of the package is classified into a category "food" or "non-food." Specifically, the reminding unit 3210 sets the predetermined time T to a default setting value (default setting value) Tdef when the type of the package falls within the category "non-food." In this case, the default value may be a value equivalent to the predetermined time T of the example illustrated in FIG. 7. Meanwhile, the reminding unit 3210 sets the predetermined time T to a setting value T1 smaller (shorter) than the default value Tdef (<Tdef) when the type of the package falls within the category "food." That is, the reminding unit 3210 sets the predetermined time T shorter when the type of the package falls within the category "food" as compared with a case of falling within the category "non-food." Therefore, since an expiration date is usually set for a food, the center server 30 is capable of earlier reminding the client to receive the package when the package contains a food.

When the category "food" that the package falls within is further classified into a plurality of subcategories according to its expiration date or best-by date, the reminding unit 3210 may set the predetermined time T shorter as a food contained in the package falls within a subcategory for the shorter expiration date, as described above. Accordingly, the center server 30 is capable of adjusting a reminding timing in accordance with the expiration date or best-by date.

Moreover, the reminding unit 3210 alters the predetermined time T depending on whether the type of the package is classified into a category "gift" or "non-gift." Specifically, the reminding unit 3210 sets the predetermined time T to a default setting value (default setting value) Tdef when the type of the package falls within the category "non-gift." Meanwhile, the reminding unit 3210 sets the predetermined time T such that the predetermined time T passes before a date corresponding to a gift, or before the end date of a period corresponding to a gift (hereinafter simply referred to as a "corresponding date") when the type of the package falls within the category "gift." More specifically, the reminding unit 3210 temporarily sets the predetermined time T such that the predetermined time T ends a predetermined time width ΔT1 (for example, three days) before a predetermined time point (for example, 11:00 a.m.) of the corresponding date when the type of the package falls within the category "non-gift." The reminding unit 3210 may determine the smaller value of the temporarily set predetermined time T (a temporary setting value) and the default value Tdef as the official predetermined time T. Accordingly, the center server 30 is capable of urging the client to receive the package (product) which is a gift to other people such as a family member or a friend at the timing before the anniversary or the end date of a period for giving a year-end present.

The reminding unit 3210 may alter, of course, the predetermined time T depending on whether the type of the package falls within the categories "food" and "gift", the type of the package falls within either category "food" or "gift", or the type of the package does not fall within any of those categories. In this case, the reminding unit 3210 may adopt, when the type of the package falls within the categories "food" and "gift", as the official predetermined time T the shorter time of the predetermined time T temporarily set by a setting method corresponding to the category "food"

and the predetermined time T temporarily set by a setting method corresponding to the category "gift" by comparing them.

Since processes of steps S208 to S212 are the same as the processes of steps S104 to S108 in FIG. 7, description thereof will be omitted.

As described above, in the example, the center server 30 decides the predetermined time T corresponding to the reminding timing in accordance with the type of the package. Consequently, it is possible to adjust a timing of reminding the client to receive the package from the trunk of the vehicle 10A according to the type of the package.

Figure 9:
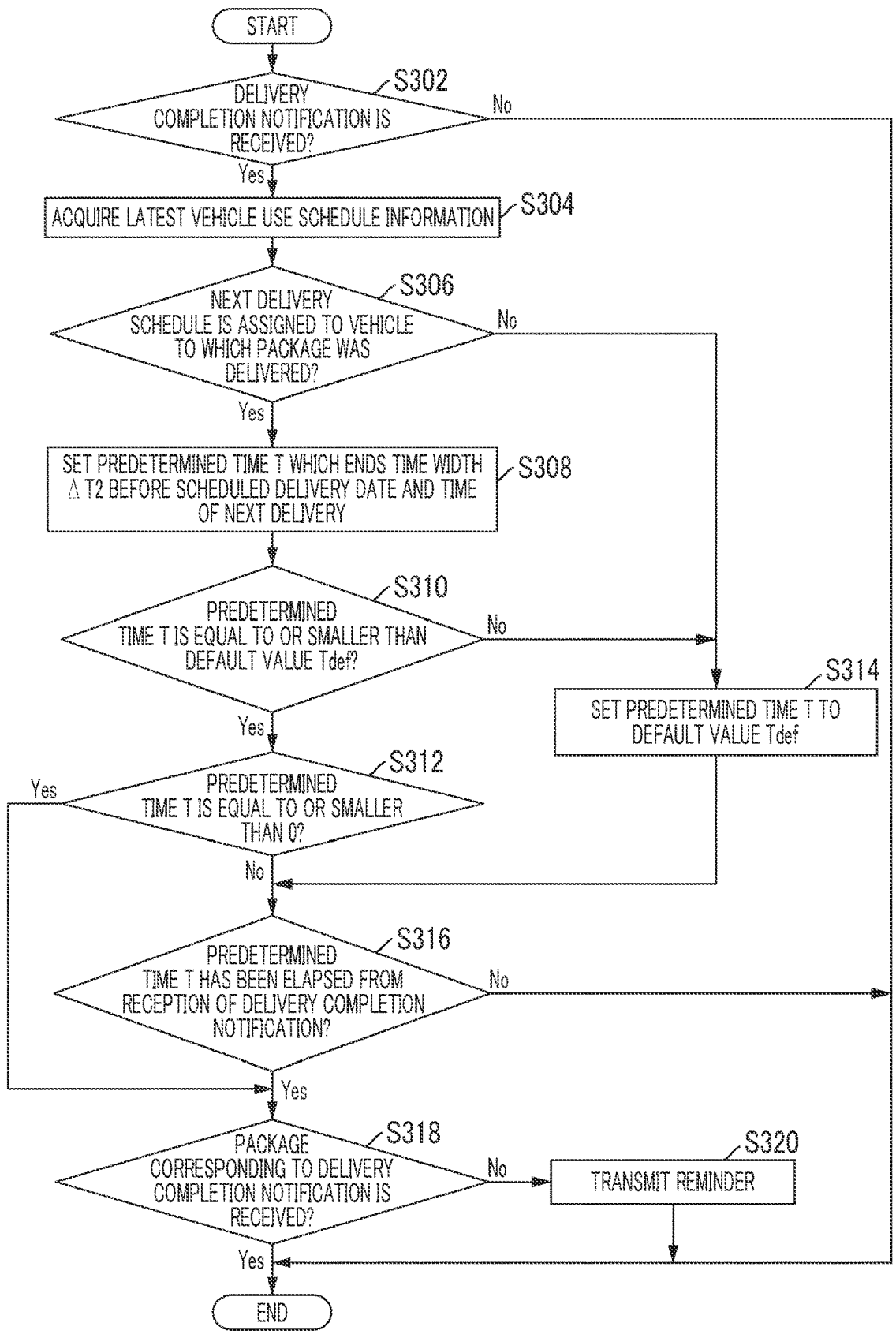
FIG. 9 is a flowchart schematically showing a third example of a reminding process of the center server.

FIG. 9 is a flowchart schematically showing a third example of the package receipt reminding process of the center server 30.

Since a process of step S302 is the same as the process of step S102 in FIG. 7, description thereof will be omitted.

In step S302, the reminding unit 3210 proceeds step S304 when the delivery completion notification has been received by the communication processing unit 3201.

In step S304, the reminding unit 3210 acquires the latest vehicle use schedule information stored in the storage unit 3200 via the schedule management unit 3205 (an example of the use schedule information acquisition unit).

In step S306, the reminding unit 3210 determines whether or not the next delivery schedule is allocated to the vehicle 10A to which a package corresponding to the delivery completion notification has been delivered based on the acquired latest vehicle use schedule information. The reminding unit 3210 proceeds to step S308 when the next delivery is scheduled, and otherwise the reminding unit 3210 proceeds to step S314.

It may be assumed a case where there is a plurality of delivery companies providing the vehicle cabin delivery service (that is, a case where the delivery management server 50 is respectively assigned to each of the delivery companies). In this case, the reminding unit 3210 determines whether the next delivery is scheduled or not in consideration of the vehicle cabin delivery service provided by delivery companies other than the delivery company corresponding to the delivery completion notification of this time.

In step S308, the reminding unit 3210 (temporarily) sets the predetermined time T such that the predetermined time T ends a predetermined time width ΔT2 (for example, a day) before the subsequent scheduled delivery date and time (starting time of the scheduled delivery time period in the scheduled delivery date). In this case, the scheduled delivery date and time may include the designated delivery date and time (specifically, designated delivery date and delivery time period) which have been designated by the client upon ordering the product at the EC site. The scheduled delivery date and time may also include the scheduled delivery date and time determined by the delivery company based on the vehicle use schedule information acquired from the center server 30 or the like when, for example, "available anytime" is checked out upon ordering the product at the EC site and selecting the delivery date and time.

In step S310, the reminding unit 3210 determines whether or not the predetermined time T temporarily set in step S308 is equal to or smaller than the default value Tdef. The reminding unit 3210 proceeds to step S312 when the predetermined time T temporarily set in step S308 is equal to or smaller than the default value Tdef, and proceeds to step S314 when the predetermined time T is not equal to or smaller than the default value Tdef.

In step S312, the reminding unit 3210 determines whether the predetermined time T set in step S308 is equal to or smaller than zero (0). The reminding unit 3210 employs the predetermined time T set in step S308 as the official setting and proceeds to step S316 when the predetermined time T set in step S308 is not equal to or smaller than zero. The reminding unit 3210 proceeds to step S318 when the predetermined time T is equal to or smaller than zero.

Meanwhile, in step S314, the reminding unit 3210 sets the predetermined time T to the default value Tdef, and proceeds to step S316.

Since processes of steps S316 to S320 are the same as the processes of steps S104 to S108 in FIG. 7, description thereof will be omitted.

In step S320, the reminding unit 3210 may transmit a reminder including a notification for informing that the next delivery is expected when the next delivery is scheduled. Accordingly, the client can also remember that the next delivery is scheduled.

As described above, in the example, the center server 30 sets (determines) the predetermined time T such that the predetermined time T passes before the subsequent scheduled delivery date and time when the next delivery schedule is planned with the trunk of the vehicle 10A designated as the delivery destination. Accordingly, the center server 30 can remind the client to receive the package before the next delivery to the trunk of the vehicle 10A. Therefore, the center server 30 allows the client to pick up the delivered package from the trunk of the vehicle 10A before the next package is delivered. Consequently, the center server 30 is capable of suppressing that the deliverer cannot put the package into the trunk due to the previous package that the user fails to pick up and from delivering such a package again.

Figure 10:
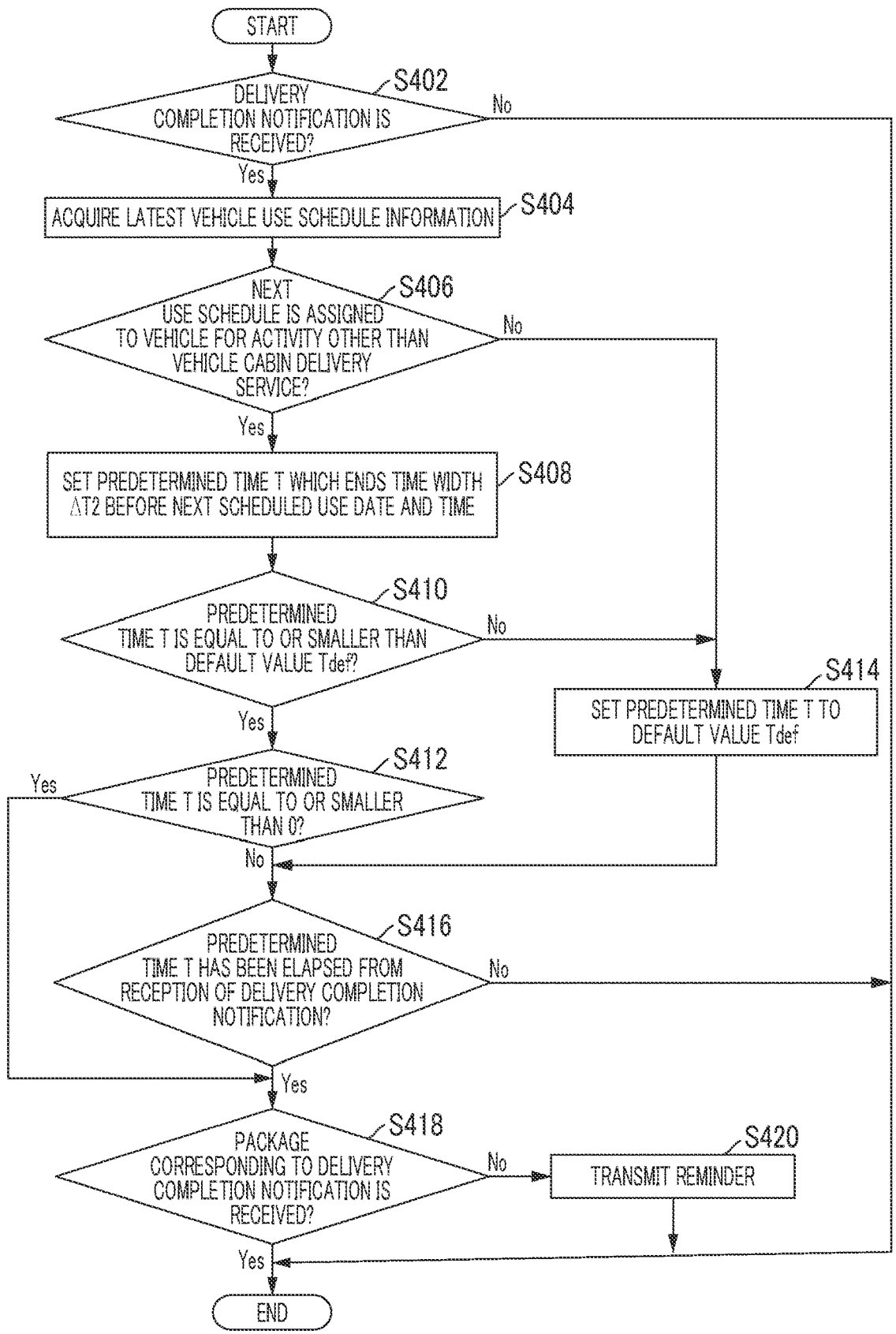
FIG. 10 is a flowchart schematically showing a fourth example of a reminding process of the center server.

FIG. 10 is a flowchart schematically showing a fourth example of the package receipt reminding process of the center server 30.

Since processes of steps S402 and S404 are the same as the processes of steps S302 and S304 in FIG. 9, description thereof will be omitted.

In step S406, the reminding unit 3210 determines whether or not the use delivery schedule is assigned to the vehicle 10A to which a package corresponding to the delivery completion notification has been delivered, other than the vehicle cabin delivery service, based on the acquired latest vehicle use schedule information. In this case, the next use schedule may include use schedule of the vehicle 10A by a regular user other than the client, or use schedule related to a service (for example, the C2C car sharing service) other than the vehicle cabin delivery service. The reminding unit 3210 proceeds to step S408 when the next use schedule is planned, and otherwise the reminding unit 3210 proceeds to step S414.

In step S408, the reminding unit 3210 (temporarily) sets the predetermined time T such that the predetermined time T ends a predetermined time width ΔT2 (for example, a day) before the subsequent scheduled use date and time (specifically, starting time of use in the scheduled use date).

Since processes of steps S410 to S420 are the same as the processes of steps S310 to S320 in FIG. 9, description thereof will be omitted.

As described above, in the example, the center server 30 sets (determines) the predetermined time T such that the predetermined time T passes before the subsequent scheduled use date and time when the next use schedule, other than the vehicle cabin delivery service, is assigned to the vehicle 10A to which the package has been delivered. Accordingly, the center server 30 can remind the client to receive the package before the next use schedule relating to activities other than the vehicle cabin delivery service. Therefore, the center server 30 allows the client to pick up the delivered package from the trunk of the vehicle 10A prior to the next use schedule. Consequently, the center server 30 is capable of suppressing that the client does not receive the package delivered to the trunk of the vehicle 10A for the vehicle 10A is moved before the next use schedule relating to activities other than the vehicle cabin delivery service.

Any of the processes of FIGS. 8 to 10 may be appropriately combined.

For example, when the processes of FIGS. 9 and 10 are combined, in step S406 of FIG. 10, it may be determined whether or not the next use schedule of the vehicle 10A, including the vehicle cabin delivery service, is expected or not. In step S408, the predetermined time T may be (temporarily) set such that the predetermined time T ends a predetermined time width ΔT2 (for example, a day) before the subsequent scheduled use date and time of the vehicle 10A, including the vehicle cabin delivery service.

Moreover, for example, when the processes of FIGS. 8 and 9 are combined, the predetermined time T (temporarily) set in step S206 may be compared with the predetermined time T immediately before proceeding to step S316 (the predetermined time T set in step S308 or step S314). The processes of steps S208 to S212 (steps S316 to S320) may be performed upon employing the shorter time as a result of comparison. The same applies to a case where the processes of FIGS. 8 and 10 are combined, and a case where the process of FIG. 8 is further combined with the processes of FIGS. 9 and 10.

Operation

In the embodiment, the reminding unit 3210 reminds the user (client) to receive a package from the vehicle cabin (trunk) of the vehicle 10A when the package is not received from the vehicle cabin of the vehicle 10A after the predetermined time T has been elapsed since the package was delivered to the vehicle cabin of the vehicle 10A designated as the delivery destination of the package by the user.

Accordingly, the center server 30 or the delivery management server 50 (hereinafter referred to as a "center server 30 or the like" for convenience) reminds the user to receive the package such that the user is urged to pick up the package when the package is not received from the vehicle cabin of the vehicle 10A even after a certain time has been elapsed since the delivery was completed. Therefore, the center server 30 or the like allows the user to receive the package delivered to the vehicle cabin of the vehicle 10A relatively earlier after the completion of delivery by appropriately setting a reminding timing, i.e. the predetermined time T. Therefore, the center server 30 or the like is capable of suppressing that the delivered package is left in the vehicle cabin of the vehicle 10A.

In the embodiment, the determination source information acquisition unit 3208 acquires information on whether or not the package is received from the vehicle cabin of the vehicle 10A. The determination unit 3209 determines whether or not the package is received from the vehicle cabin of the vehicle 10A based on the information acquired by the determination source information acquisition unit 3208. The reminding unit 3210 reminds the user to receive the package from the vehicle cabin of the vehicle 10A when the determination unit 3209 determines that the package is not received from the vehicle cabin of the vehicle 10A after the predetermined time T has been elapsed since the package was delivered to the vehicle cabin of the vehicle 10A.

Accordingly, the center server 30 or the like is capable of, by acquiring the information on whether or not the delivered package is received, determining whether or not the package is received from the vehicle cabin of the vehicle 10A based on such information.

In the embodiment, the determination source information acquisition unit 3208 acquires information on locking of a door by the user, in which the door accesses the vehicle cabin of the vehicle 10A designated by the user as the delivery destination of the package. The determination unit 3209 determines that the package is not received from the vehicle cabin of the vehicle 10A when the determination source information acquisition unit 3208 does not acquire the information indicating that the door has been locked by the user after the package was delivered to the vehicle cabin of the vehicle 10A.

Accordingly, the center server 30 or the like is capable of acquiring the information on locking of the door accessing the vehicle cabin of the vehicle 10A by the user. For example, the information may contain information indicating that the door of the vehicle 10A is locked by transmitting a signal containing the user specific key information to the vehicle 10A for unlocking the door of the vehicle 10A, which can be acquired from the vehicle 10A. Accordingly, the center server 30 or the like can figure out whether or not the user has locked the door accessing the vehicle cabin of the vehicle 10A after the package was delivered to the vehicle cabin of the vehicle 10A designated as the delivery destination of the package based on the information. The center server 30 or the like can determine (estimate) that, when the user has locked the door accessing the vehicle cabin of the vehicle 10A after the package was delivered, the user has accessed the vehicle cabin of the vehicle 10A and received the package before locking the door. Besides, the center server 30 or the like can determine (estimate) that, when the user has not locked the door after the package was delivered, the user has not accessed the vehicle cabin of the vehicle 10A. Therefore, specifically, the center server 30 or the like is capable of determining whether or not the delivered package is received from the vehicle cabin of the vehicle 10A after the package was delivered based on the information on locking of the door accessing the vehicle cabin of the vehicle 10A by the user.

In the embodiment, the determination source information acquisition unit 3208 acquires from the user, by a predetermined method, a receipt notification indicating that the package delivered to the vehicle cabin of the vehicle 10A is received. The determination unit 3209 determines that the package is not received from the vehicle cabin of the vehicle 10A when the determination source information acquisition unit 3208 does not acquire the receipt notification after the package was delivered to the vehicle cabin of the vehicle 10A.

Accordingly, the center server 30 or the like is capable of acquiring the receipt notification from a user terminal or user's mail address by a method including, for example, notification function or e-mail executed by an application installed in mobile terminals 20Aa, 20Ab, such as a user's smartphone. Therefore, specifically, the center server 30 or the like is capable of determining whether or not the delivered package is received from the vehicle cabin of the vehicle 10A after the package was delivered based on whether or not the receipt notification is acquired.

In the embodiment, the determination source information acquisition unit 3208 acquires the position information of the mobile terminals 20Aa, 20Ab carried by the user. The determination unit 3209 determines that the package is not received from the vehicle cabin of the vehicle 10A when the position information of the mobile terminals 20Aa, 20Ab, acquired by the determination source information acquisition unit 3208, does not indicate that the user has moved to within the predetermined range in the vicinity of the vehicle 10A after the package was delivered to the vehicle cabin of the vehicle 10A.

Accordingly, the center server 30 or the like is capable of figuring out user's movement situation, specifically, whether or not the user has moved to near the vehicle 10A (within the predetermined range) corresponding to the delivery destination of the package, by acquiring the position information of the mobile terminals 20Aa, 20Ab carried by the user. Consequently, the center server 30 or the like can determine (estimate) that the user is received the package delivered to the vehicle cabin of the vehicle 10A when the user has moved to vicinity of the vehicle 10A corresponding to the delivery destination of the package after the delivery was completed. Besides, the center server 30 or the like can determine (estimate) that the user is not received the package delivered to the vehicle cabin of the vehicle 10A when the user has not moved to vicinity of the vehicle 10A corresponding to the delivery destination of the package after the delivery was completed. Therefore, specifically, the center server 30 or the like is capable of determining whether or not the delivered package is received from the vehicle cabin of the vehicle 10A after the package was delivered based on the position information of the mobile terminals 20Aa, 20Ab carried by the user.

In the embodiment, the reminding unit 3210 reminds the user to receive the package from the vehicle cabin of the vehicle 10A by transmitting a reminder to a user terminal of the user, via a function provided by a predetermined application program installed in the user terminal of the user, when the package is not received from the vehicle cabin of the vehicle 10A after the predetermined time T has elapsed since the package was delivered to the vehicle cabin of the vehicle 10A.

Accordingly, the center server 30 or the like is capable of displaying the reminder relating to receipt of the package on, for example, a display device of the user terminal via a function provided by an application installed in the user terminal (e.g. mobile terminals 20Aa, 20Ab such as a smartphone). Therefore, the center server 30 or the like is capable of reminding the user to receive the package in the vehicle cabin of the vehicle 10A.

In the embodiment, the reminding unit 3210 may transmit to a mail address of the user, or a predetermined SNS account of the user a reminder relating to receipt of the package from the vehicle cabin of the vehicle 10A, when the package is not received from the vehicle cabin of the vehicle 10A after the predetermined time T has elapsed since the package was delivered to the vehicle cabin of the vehicle 10A.

Accordingly, the center server 30 or the like is capable of reminding the user, specifically, to receive the package from the vehicle cabin of the vehicle 10A by transmitting the reminder to user's mail address or user's SNS account.

In the embodiment, the reminding unit 3210 alters the predetermined time T in response to a type of the package.

Accordingly, the center server 30 or the like is capable of changing the timing of reminding the user in accordance with the type of the package.

In the embodiment, the reminding unit 3210 sets the predetermined time T shorter when the package contains a food as compared with a case where the package does not contain a food.

Accordingly, the center server 30 or the like is capable of transmitting the reminder earlier when the package contains a food as compared with a case where the package does not contain a food. Therefore, since an expiration date is usually set for a food and earlier receipt is needed, the center server 30 or the like is capable of allowing the user to receive the package earlier when the package contains a food as compared with a case where the package does not contain a food.

In the embodiment, the reminding unit 3210 sets the predetermined time T when the package contains a gift presented to another by the user, such that the predetermined time T passes before a date corresponding to the gift or before the end date of a period corresponding to the gift.

Accordingly, the center server 30 or the like is capable of reminding the user to receive the package from the vehicle cabin of the vehicle 10A at the timing corresponding to a gift (for example, at the timing before the anniversary such as the birthday, or at the timing before the end date of the period corresponding to a limited-time gift such as a year-end present) when the package contains a gift. Therefore, the center server 30 or the like is capable of reminding the user to remember to receive the package before the anniversary is passed so as to suppress that the user fails to give a present to other people at the right timing.

When the vehicle cabin delivery service deals with a package other than the product of the EC site, the package may be a gift presented to the user. In this case, the center server 30 or the like may determine the predetermined time T such that the predetermined time T passes before a date corresponding to the gift or before the end date of a period corresponding to the gift, similarly to the case where the user tries to give a gift to other people. Therefore, the center server 30 or the like is capable of reminding the user to remember to receive the package before the anniversary is passed so as to suppress that the user fails to get a present to himself/herself at the right timing.

In the embodiment, the reminding unit 3210 sets the predetermined time such that the predetermined time T passes before a date and time when the next package is delivered to the vehicle cabin of the vehicle 10A designated as a delivery destination of such a package.

Accordingly, the center server 30 or the like is capable of reminding the user to receive the package delivered to the vehicle cabin of the vehicle 10A before a date (for example, the delivery date and time designated by the user or the scheduled delivery date and time chosen by a delivery company) when the next package is delivered to the vehicle cabin of the vehicle 10A. Consequently, the center server 30 or the like can allow the user to receive the delivered package before the next package is delivered. Therefore, the center server 30 or the like is capable of suppressing that the deliverer cannot put the package into the vehicle cabin of the vehicle 10A due to the previous package that the user fails to pick up and from delivering such a package again, thereby improving the work efficiency of the vehicle cabin delivery service.

In the embodiment, the reminding unit 3210 acquires information (vehicle use schedule information) on a use schedule of the vehicle 10A via the schedule management unit 3205. The reminding unit 3210 sets the predetermined time T such that the predetermined time T passes before the closest date and time when another user of the vehicle 10A, other than the user, will use the vehicle 10A, or the closest date and time relating to another service using the vehicle 10A other than the delivery service, in accordance with the vehicle use schedule information.

In the embodiment, the center server 30 or the like is capable of reminding the user to receive the package from the vehicle cabin of the vehicle 10A before the closest date and time when another user will use the vehicle 10A corresponding to the delivery destination after the package was delivered. Furthermore, the center server 30 or the like is capable of reminding the user to receive the package from the vehicle cabin of the vehicle 10A before the closest date and time when a user of another service (for example, C2C car sharing service) will use the vehicle 10A corresponding to the delivery destination after the package was delivered. Therefore, the center server 30 or the like is capable of allowing the user to receive the package from the vehicle cabin of the vehicle 10A corresponding the delivery destination before the vehicle 10A is used by another user of the vehicle 10A or a user of another service using the vehicle 10A.

The embodiments have been described in detail above, but the present disclosure is not limited to the specific embodiments as described above, and various modifications and changes can be performed without departing from the gist of the present disclosure.

For example, in the embodiment described above, the mobile terminal 20 transmits the authentication request including the authentication key to the key unit 12, the key unit 12 performs exchange of signals with the locking, unlocking and activation device 11 according to an authentication result based on the authentication key, and locking and unlocking of the door of the vehicle 10A and activation of the vehicle 10A are realized by the locking, unlocking and activation device 11, however, implement of the embodiment is not limited thereto.

Specifically, a configuration in which the function of the key unit 12 is transferred to the mobile terminal 20, and the mobile terminal 20 performs exchange of signals based on the above-described key information (internal key information) with the vehicle 10 (the locking, unlocking and activation device 11) using the LF radio waves and the RF radio waves such that the locking and unlocking of the doors of the vehicle 10A and the activation of the vehicle 10A by the locking, unlocking and activation device 11 are realized may be adopted. In this case, the "authentication key" of the embodiment described above may be read as the "key information". That is, the center server 30 may issue the key information instead of the authentication key and distribute the key information to the mobile terminal 20 in the same method as in the authentication key in the above-described embodiment. Accordingly, the same operation and effects as those of the above-described embodiment can be obtained.

The functions of the key unit 12 may be integrated with the locking, unlocking and activation device 11, and a configuration regarding communication between the locking, unlocking and activation device 11 and the key unit 12 and authentication related to the communication (the LF radio wave transmitter 111, the RF radio wave receiver 112, the collating ECU 113, the LF radio wave receiver 121, and the RF radio wave transmitter 122) may be omitted. In this case, when the authentication of the mobile terminal 20 based on the authentication key has been successful, the key ECU 124 may directly output an unlocking command or a locking command and an activation command to each of the body ECU 114 and the engine ECU 116 instead of the collating ECU 113, and perform locking and unlocking the doors of the vehicle 10 and activation of the vehicle 10. Accordingly, the same operation and effects as those of the above-described embodiment can be obtained.

What is claimed is:

1. An information processing system comprising:
a door sensor;
a locking unit; and
a center server;
wherein the information processing system relates to a delivery service in which a vehicle cabin including a trunk of a vehicle used by a user is designated as a delivery destination of a package;
wherein the door sensor is configured to monitor opening and closing a door of the vehicle cabin, and the center server is configured to monitor and determine whether or not a door accessing the vehicle cabin is opened and closed to pick up the package after the package was delivered; and
wherein the center server is configured to remind the user to retrieve the package from the vehicle cabin of the vehicle designated by the user as the delivery destination of the package if the center server determines that the door accessing the vehicle cabin was not opened and closed to pick up the package after the package was delivered based on notification received from the door sensor after a predetermined time has elapsed since the package was delivered to the vehicle cabin, the predetermined time being set in accordance with a type of the package.

2. The information processing system according to claim 1, wherein:
the center server is configured to acquire information on whether or not the package is received from the vehicle cabin of the vehicle.

3. The information processing system according to claim 2, wherein:
the center server is configured to determine whether or not the package is received from the vehicle cabin of the vehicle based on the information acquired by the center server.

4. The information processing system according to claim 3, wherein:
the center server is configured to remind the user to receive the package from the vehicle cabin in a case where the center server determines that the package is not received from the vehicle cabin after the predetermined time has elapsed since the package was delivered to the vehicle cabin.

5. The information processing system according to claim 4, wherein:
the center server is configured to acquire information on locking of a door by the user, the door via which the user accesses the vehicle cabin designated by the user as the delivery destination of the package.

6. The information processing system according to claim 5, wherein:
the center server is configured to determine that the package is not received from the vehicle cabin in a case where the center server does not acquire the information indicating that the door has been locked by the user after the package was delivered to the vehicle cabin.

7. The information processing system according to claim 3, wherein:
the center server is configured to acquire from the user, a receipt notification indicating that the user has received the package delivered to the vehicle cabin.

8. The information processing system according to claim 7, wherein:
the center server is configured to determine that the package is not received from the vehicle cabin in a case where the center server does not acquire the receipt notification after the package was delivered to the vehicle cabin.

9. The information processing system according to claim 3, wherein:
the center server is configured to acquire position information of a mobile terminal carried by the user.

10. The information processing system according to claim 9, wherein:
the center server is configured to determine that the package is not received from the vehicle cabin of the vehicle in a case where the position information of the mobile terminal, acquired by the center server, does not indicate that the user has moved to within a predetermined range from the vehicle after the package was delivered to the vehicle cabin.

11. The information processing system according to claim 1, wherein the center server is configured to remind the user to receive the package from the vehicle cabin by transmitting a reminder to a user terminal of the user, via a function provided by a predetermined application program installed in the user terminal of the user, in a case where the package is not received from the vehicle cabin after the predetermined time has elapsed since the package was delivered to the vehicle cabin.

12. The information processing system according to claim 1, wherein the center server is configured to transmit to a mail address of the user, or a predetermined social networking service account of the user, a reminder relating to receipt of the package from the vehicle cabin, in a case where the package is not received from the vehicle cabin of the vehicle after the predetermined time has elapsed since the package was delivered to the vehicle cabin.

13. The information processing system according to claim 1, wherein the center server is configured to alter the predetermined time in accordance with the type of the package.

14. The information processing system according to claim 13, wherein the center server is configured to set the predetermined time shorter in a case where the package contains a food as compared with a case where the package does not contain a food.

15. The information processing system according to claim 14, wherein the center server is configured to set the predetermined time in a case where the package contains a gift presented to another by the user or presented to the user, such that the predetermined time passes before a date corresponding to the gift, or before an end date of a period corresponding to the gift.

16. The information processing system according to claim 1, wherein the center server is configured to set the predetermined time such that the predetermined time passes before a date and time when a next package is delivered to the vehicle cabin designated as a delivery destination of such a package.

17. The information processing system according to claim 1, wherein:
the center server is configured to acquire information on a use schedule of the vehicle.

18. The information processing system according to claim 17, wherein:
the center server is configured to set the predetermined time such that the predetermined time passes before a closest date and time when another user of the vehicle, other than the user, will use the vehicle, or a closest date and time relating to another service using the vehicle other than the delivery service, in accordance with the information on the use schedule.

19. An information processing method comprising:
executing by a center server relating to a delivery service in which a vehicle cabin, including a trunk of a vehicle used by a user, is designated as a delivery destination of a package, the steps comprising:
receiving a notification indicating that a door of the vehicle cabin is opened, the notification being transmitted from a door sensor configured to monitor opening and closing the door;
determining, as a first determination, whether or not a door accessing the vehicle cabin is opened and closed to pick up the package after the package was delivered based on the notification;
determining, as a second determination, whether the package is received from the vehicle cabin after a predetermined time has elapsed since the package was delivered to the vehicle cabin based on a result of the first determination that the door accessing the vehicle cabin was not opened and closed to pick up the package; and
reminding the user to retrieve the package from the vehicle cabin of the vehicle designated by the user as the delivery destination of the package, in response to a result of the second determination that the package is not received from the vehicle cabin after the predetermined time has elapsed since the package was delivered to the vehicle cabin,
wherein the predetermined time is set in accordance with a type of the package.

20. A non-transitory computer-readable storage medium storing an information processing program thereon which, upon execution by a center server, causes the center server to execute functions, the functions comprising:
receiving a designation, for a delivery service related to the center server, of a vehicle cabin, including a trunk of a vehicle used by a user, as a delivery destination of a package;
receiving a notification indicating that a door of the vehicle cabin is opened, the notification being transmitted from a door sensor configured to monitor opening and closing the door;
determining, as a first determination, whether or not a door accessing the vehicle cabin is opened and closed to pick up the package after the package was delivered based on the notification;
determining, as a second determination, whether the package is received from the vehicle cabin after a predetermined time has elapsed since the package was delivered to the vehicle cabin based on a result of the first determination; and
reminding the user to retrieve the package from the vehicle cabin of the vehicle designated by the user as the delivery destination of the package, in response to a result of the second determination that the package is not received from the vehicle cabin after the predetermined time has elapsed since the package was delivered to the vehicle cabin, the predetermined time being set in accordance with a type of the package.

\* \* \* \* \*